(12) United States Patent  (10) Patent No.: US 8,292,427 B2
Zelazowski  (45) Date of Patent: Oct. 23, 2012

(54) SCREWLESS MAGNETIC EYEWEAR

(75) Inventor: Dennis G. Zelazowski, Pittsburgh, PA (US)

(73) Assignee: Phyzics Properties Inc., Pittsburgh, PA (US)

( * ) Notice: Subject to any disclaimer, the term of this patent is extended or adjusted under 35 U.S.C. 154(b) by 83 days.

(21) Appl. No.: 12/857,708

(22) Filed: Aug. 17, 2010

(65) Prior Publication Data

US 2010/0309425 A1    Dec. 9, 2010

Related U.S. Application Data

(63) Continuation-in-part of application No. 11/610,245, filed on Dec. 13, 2006, now Pat. No. 7,794,080.

(60) Provisional application No. 60/749,851, filed on Dec. 13, 2005.

(51) Int. Cl.
*G02C 5/12* (2006.01)

(52) U.S. Cl. ............................ 351/138; 351/80; 351/136

(58) Field of Classification Search .......... 351/136–139, 351/78–82
See application file for complete search history.

(56) References Cited

U.S. PATENT DOCUMENTS

| | | | |
|---|---|---|---|
| 3,264,678 A | 8/1966 | Parmelee | |
| 3,422,449 A | 1/1969 | Rinnman | |
| 5,682,222 A | 10/1997 | Chao | |
| 5,691,796 A * | 11/1997 | Negishi | 351/55 |
| 5,988,811 A | 11/1999 | Ku | |
| 6,217,170 B1 | 4/2001 | Hsiao | |
| 6,550,913 B2 | 4/2003 | Zelman | |
| 6,554,423 B2 * | 4/2003 | Kroman | 351/138 |
| 6,736,504 B1 | 5/2004 | Hermsen | |
| 7,497,571 B2 | 3/2009 | Rossin | |
| 2003/0098949 A1* | 5/2003 | Dietz | 351/112 |

FOREIGN PATENT DOCUMENTS

| | | |
|---|---|---|
| CA | 2321318 | 4/2002 |
| EP | 0971255 | 1/2000 |
| FR | 2885230 | 11/2003 |
| JP | 10284317 | 10/1998 |
| WO | 2004066019 | 8/2004 |

* cited by examiner

*Primary Examiner* — Huy K Mai
(74) *Attorney, Agent, or Firm* — Cohen & Grigsby, PC

(57) ABSTRACT

The invention provides a magnetic connector for use between members to magnetically connect members such as members between eyewear. Magnetic connector has first and second magnets positioned in or on first and second eyewear members, respectively. Magnets are positioned substantially parallel to each other in a plane and rotate about an axis. A magnetic field of attraction is created between magnets when magnets are in sufficient proximity to each other thereby substantially connecting members. When magnets disengage or fall out of alignment due to force or pressure against members, magnets disengage and allow members to break away without damage. In an embodiment, a magnetic nose pad assembly is disclosed that is used to magnetically attach a nose pad to a nose pad arm.

20 Claims, 31 Drawing Sheets

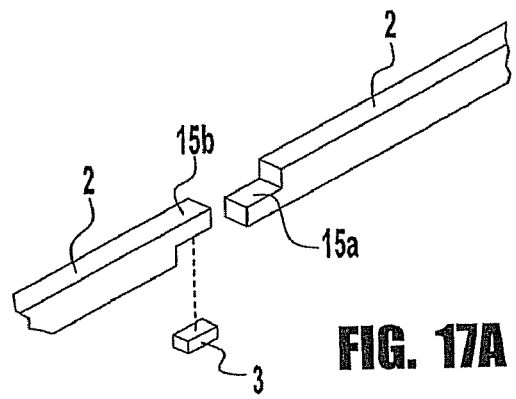
FIG. 17A
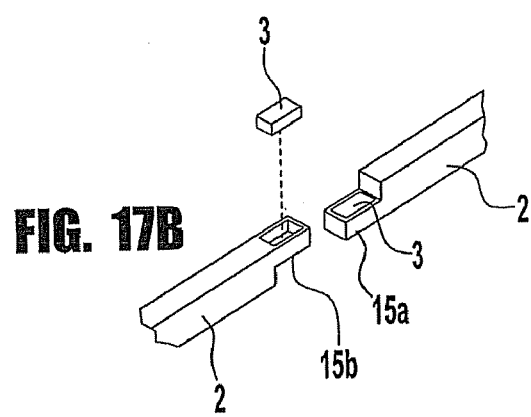
FIG. 17B
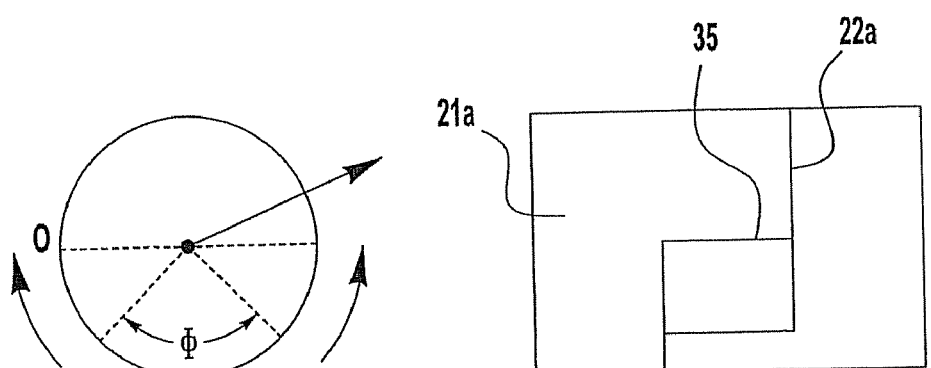
FIG. 18A
FIG. 18B

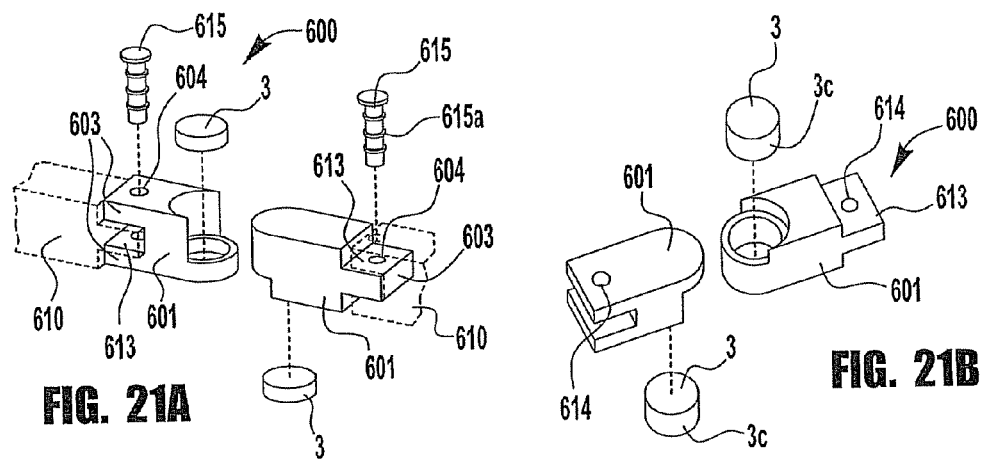
FIG. 21A
FIG. 21B
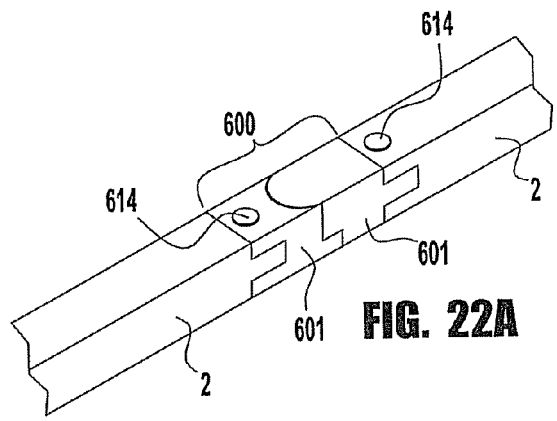
FIG. 22A
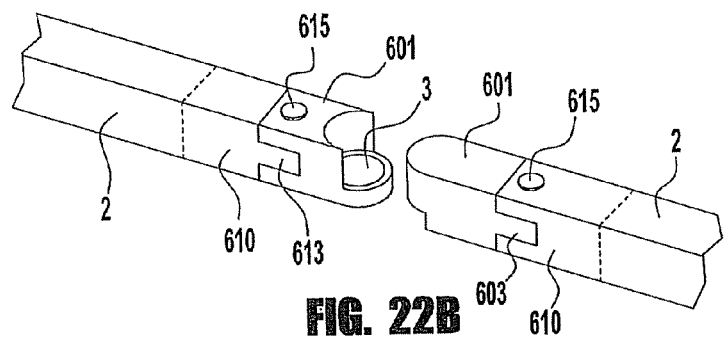
FIG. 22B

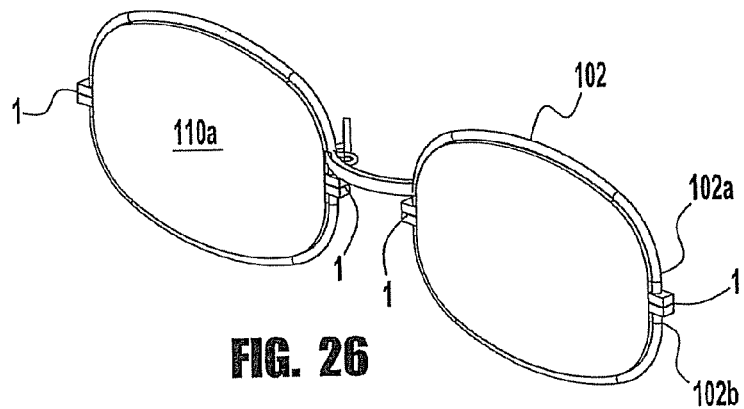
FIG. 26
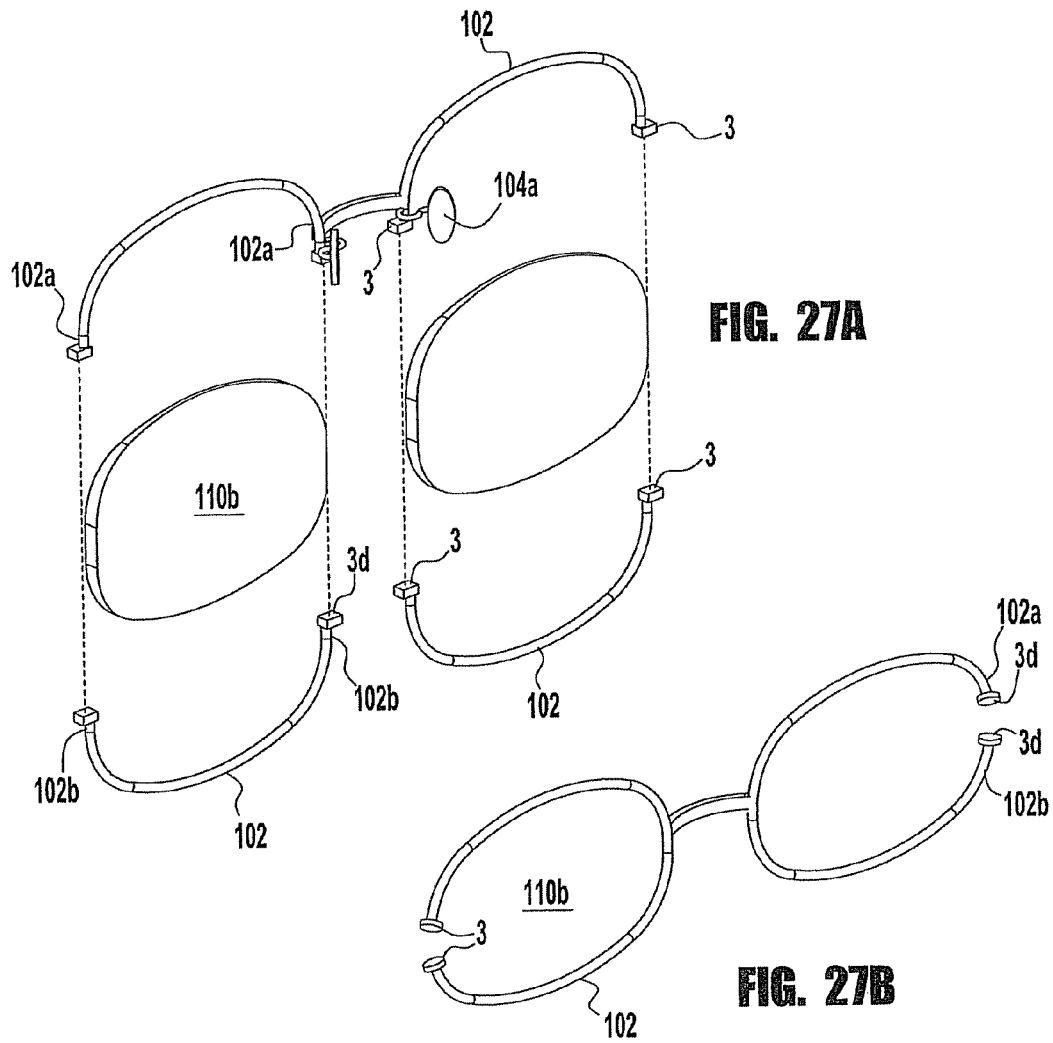
FIG. 27A
FIG. 27B

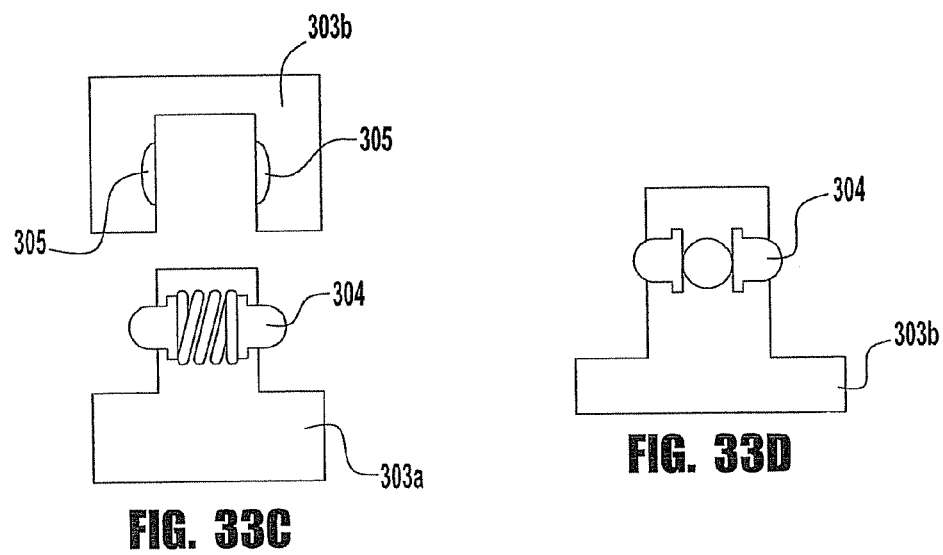
FIG. 33C
FIG. 33D
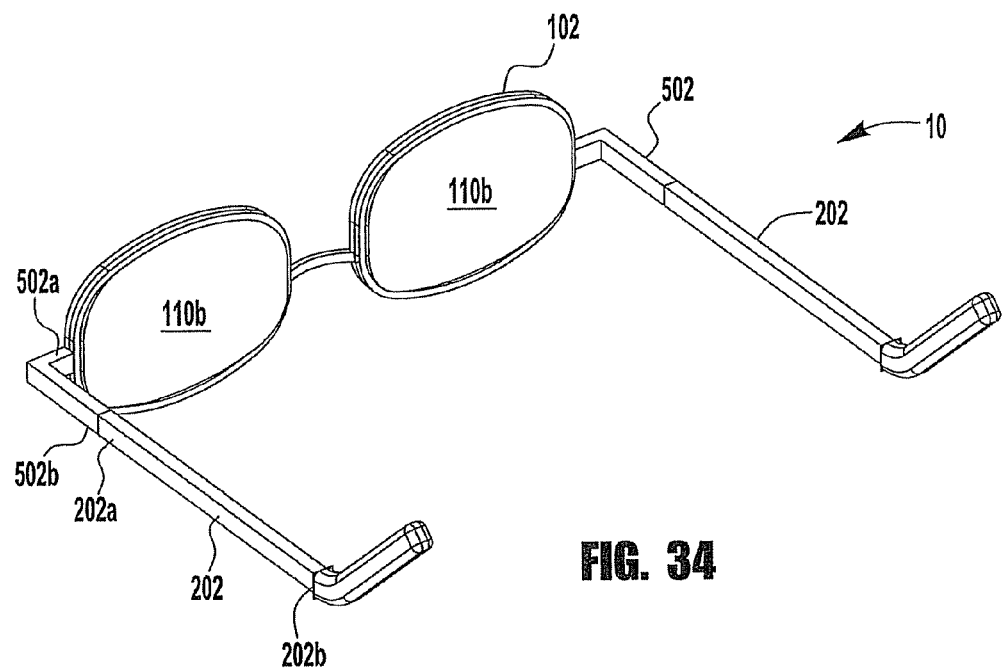
FIG. 34

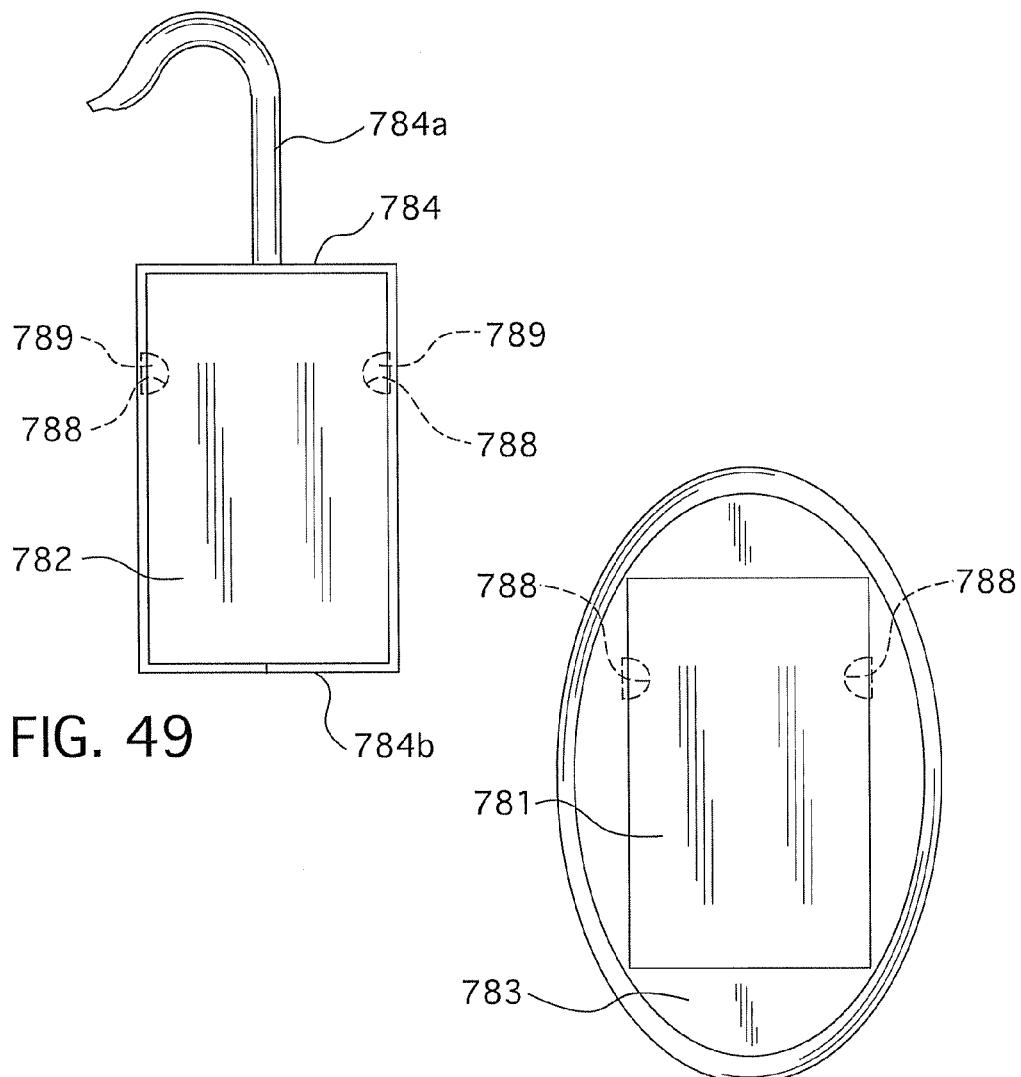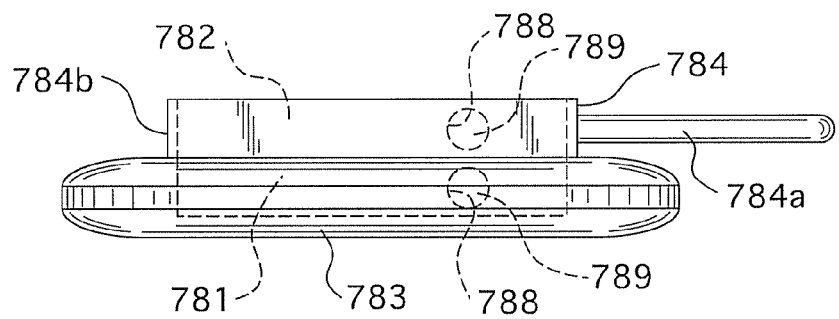

SCREWLESS MAGNETIC EYEWEAR

CLAIM OF PRIORITY

This invention claims the benefit of U.S. patent application Ser. No. 11/610,245, filed on Dec. 13, 2006, which claims the benefit of U.S. Provisional Application Ser. No. 60/749,851, filed on Dec. 13, 2005.

FIELD OF THE INVENTION

The invention relates to a connector for use in eyewear, and particularly to a magnetic connector that can be used at connection points of eyewear.

BACKGROUND OF THE INVENTION

A large percentage of the population today relies on prescription or protective eyewear. However, often everyday activities result in damage to the eyewear. Simply falling asleep in eyeglasses can distort their shape, causing them to wear unevenly. Young children tend to grab at and bend or otherwise damage their caregiver's eyewear. Likewise, athletes and children often engage in activities that result in damage to their own eyewear. Furthermore, every day activities can bend, break, and/or detach members of the eyewear thereby damaging and disfiguring the eyewear. Often times the miniature screws that hold the eyewear together are lost and must be replaced. These miniature screws are difficult to handle and replace, making repairs tedious and time consuming even for eyecare professionals.

To date, there have not been any viable solutions for minimizing damage to eyewear and/or for eliminating the need for replacing the miniature screws that hold the eyewear members together. All attempts to create a more forgiving, detachable frame have failed because by and large these frames have ultimately resulted in breakage, metal fatigue, loss of miniature screws, or severe disfigurement that renders the eyewear useless. Therefore, it is desirable to have a connector that is flexible, durable, easy to handle and replace, and that can be used at any connection point on eyewear.

SUMMARY OF THE INVENTION

In an embodiment, the present invention meets this need by providing a magnetic connector for use at connection points between members to magnetically connect members together. In an embodiment, the magnetic connector comprises first and second magnets, each positioned in or on first and second members, respectively. The magnets have substantially opposite polarities and are positioned substantially parallel to each other in a plane. Magnets rotate about an axis. When the magnets are positioned in sufficient proximity to each other to create a magnetic field of attraction, members are thereby substantially connected. In examples, magnets are in either a horizontal or vertical plane. In a preferred example, there is a means of limiting rotation to prevent magnets from rotating 360° about the axis.

In an alternate embodiment, the invention is a magnetic connector comprising first and second magnets of substantially the same polarity. One magnet is positioned in or on a first member and the other magnet is positioned in or on a second member. Magnets are positioned substantially parallel to each other in a plane and rotate about an axis. The connector further comprises a lock and key configured to engage each other. The lock is located on one of the members and the key is located on the other member. When the lock and key are engaged, and magnets are positioned in proximity to each other sufficient to create a field of magnetic repulsion, members are pushed away from each other and a tension is created that secures the engagement between the lock and key, thereby securing the connection of first and second members.

In an alternate embodiment, the present invention is a pair of eyeglasses comprising first and second members and the magnetic connector that connects members at a connection point. Magnets of the magnetic connector may be either the same or opposite polarities.

In another embodiment, conventional eyewear is retrofitted with a magnetic hinge adapter that converts and replaces conventional connectors such as miniature screw and hinge mechanisms to a magnetic connector. The magnetic hinge adapter comprises at least one adapter piece comprising a magnetic surface and at least one platform having a hole therein. The adapter piece is configured to integrate with the screw hinge to secure the adapter piece to the screw hinge. In an example, the hole in the platform of the adapter piece substantially aligns with a hole in a platform of the screw hinge. When aligned, the holes are capable of receiving a securing means to secure the magnetic adapter piece to the screw hinge. In an example, the magnetic hinge adapter further comprises a second adapter piece. Magnetic surfaces of adapter pieces are magnetically attracted so that first and second adapter pieces are a connection point between two members of eyewear, thereby providing a flexible point of connection.

In another embodiment, a magnetic nose pad assembly for use with a pair of eyeglasses is disclosed. The magnetic nose pad assembly has a nose pad having a cavity and a first magnetic part embedded therein. There is a nose pad arm having a first end configured to attach to a member of the eyeglasses and a second end attached to a second magnetic part that is configured to come into contact with the first magnetic part during use to magnetically connect the nose pad and nose pad arm.

In another embodiment, a magnetic nose pad assembly for use with a pair of eyeglasses is disclosed. The magnetic nose pad assembly has a nose pad having a cavity in a surface thereof. A first magnetic part is embedded in the cavity. There is a second magnetic part configured for magnetic attraction to the first magnet. A nose pad arm has a first end configured to attach to a member of the eyeglasses and a second end attached to the second magnetic part. First and second magnetic parts are configured to come into contact with each other during use to magnetically connect the nose pad and nose pad arm.

In another embodiment, a pair of eyeglasses is disclosed. The pair of eyeglasses has first and second members and a magnetic nose pad assembly set. Each member of the magnetic nose pad assembly set includes a nose pad having a cavity in a surface thereof. A first magnetic part is embedded in the cavity. A second magnetic part is configured for magnetic attraction to the first magnetic part. A nose pad arm has a first end that is configured to attach to the first member of the eyeglasses and a second end that is attached to the second magnetic part. The first and second magnetic parts are configured to come into with each other during use to magnetically connect the nose pad and nose pad arm.

Accordingly, it is an object in an embodiment of the present invention to provide a magnetic connector that replaces conventional connection means in eyewear.

It is yet another object in an embodiment of the present invention to provide a magnetic connector that is easy to handle and repair or replace.

It is another object of the present invention to provide a magnetic connector that minimizes damage to eyewear when a component or member of the eyewear is bent or tensioned.

It is another object of the present invention to provide a magnetic connector that enables members of eyewear to be interchanged with other members to alter the aesthetic appearance of eyewear.

It is still a further object of the present invention to provide a magnetic connector that can be included in the eyewear during manufacture of the eyewear.

It is a further object of the present invention to provide members joined at a connection point with breakaway capability at the connection point.

It is still another object of the present invention to provide members that can be reconnected at connection points after members breakaway.

It is another object of the present invention to provide a magnetic connector that can be retrofitted to any eyewear.

It is yet another object in an embodiment of the present invention to provide a pair of eyeglasses having a magnetic connector at connection points.

It is a further object in an embodiment of the present invention to provide eyewear that is able to tolerate or withstand bending and tension at a connection point.

It is a further object in an embodiment of the present invention to provide eyewear that does not require miniature screws at the connection points.

Other objects, features, aspects and advantages of the present invention will become better understood or apparent from the following detailed description, drawings, and appended claims of the invention.

BRIEF DESCRIPTION OF THE DRAWINGS

FIG. 17 shows exploded perspective views of examples of embodiments of the claimed magnetic connector in combination with members in which magnets are positioned parallel to each other in a horizontal plane.

FIG. 18 shows a perspective view of an example of magnets comprising magnetic connector.

FIG. 21 shows exploded perspective views of examples of embodiments of the claimed magnetic hinge adapter.

FIG. 22 shows perspective views of examples of embodiments of the claimed magnetic hinge adapter connected to members.

FIG. 26 shows perspective views of examples of embodiments of the magnetic connector in combination with eyewires.

FIG. 27A shows an exploded perspective view of an example of an embodiment of the magnetic connector in combination with eyewires.

FIG. 27B shows a perspective view of an example of an embodiment of the magnetic connector in combination with eyewires.

FIGS. 33C-33D show side views of examples of magnetic connector further comprising cushion mechanism.

FIG. 34 shows a perspective view of an example of an embodiment of the magnetic connector in combination with eyewear in which magnets are positioned in a vertical plane.

FIG. 49 shows a top view of the magnetic nose pad assembly shown in FIG. 48 without the nose pad.

FIG. 50 shows a side view of the magnetic nose pad assembly shown in FIG. 48.

FIG. 51 shows a top view of the magnetic nose pad assembly shown in FIG. 48 without the nose pad arm.

DETAILED DESCRIPTION OF EMBODIMENTS OF THE INVENTION

Figure 1:
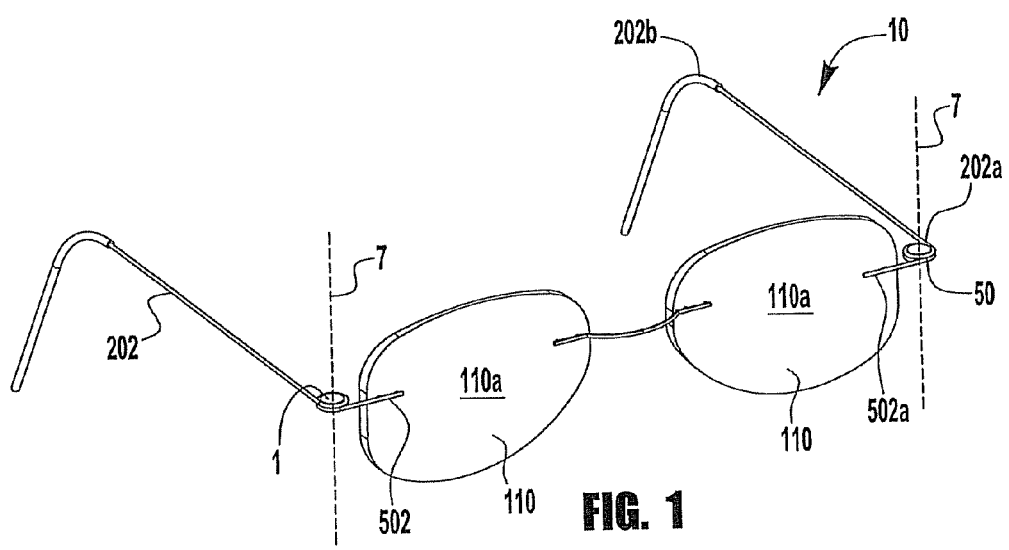
FIGS. 1, 3, and 5 show perspective views of examples of embodiments of the claimed magnetic connector in combination with eyewear in which magnets are positioned parallel to each other in a horizontal plane.
Figure 2:
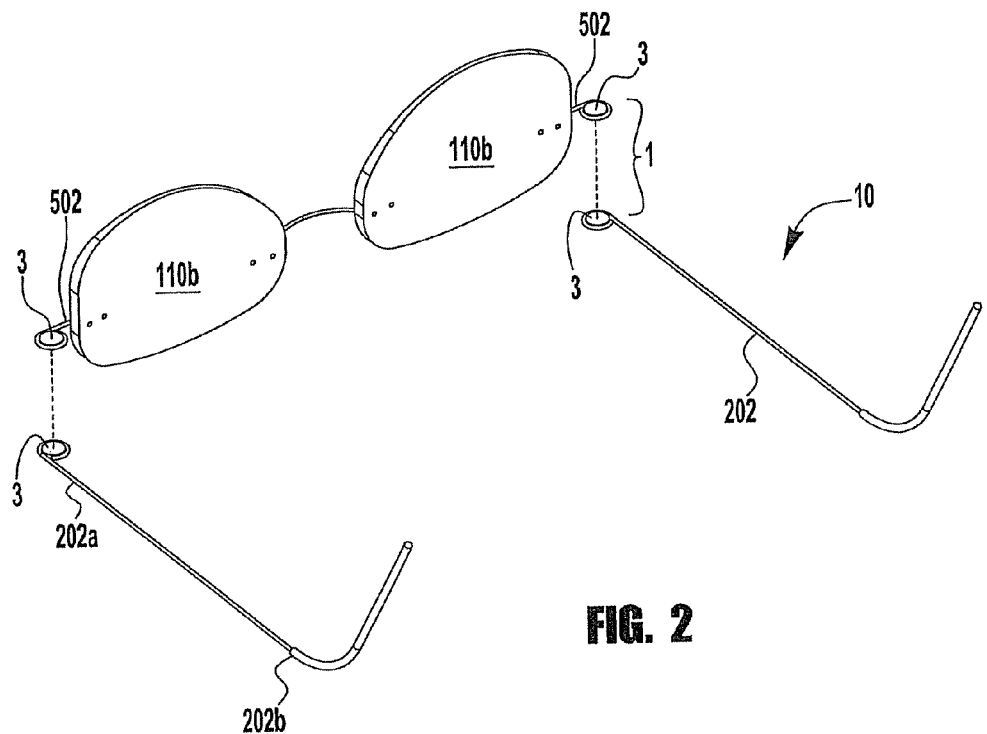
FIGS. 2, 4, and 6 show exploded perspective views of examples of embodiments of the claimed magnetic connector in combination with eyewear in which magnets are positioned parallel to each other in a horizontal plane.
Figure 3:
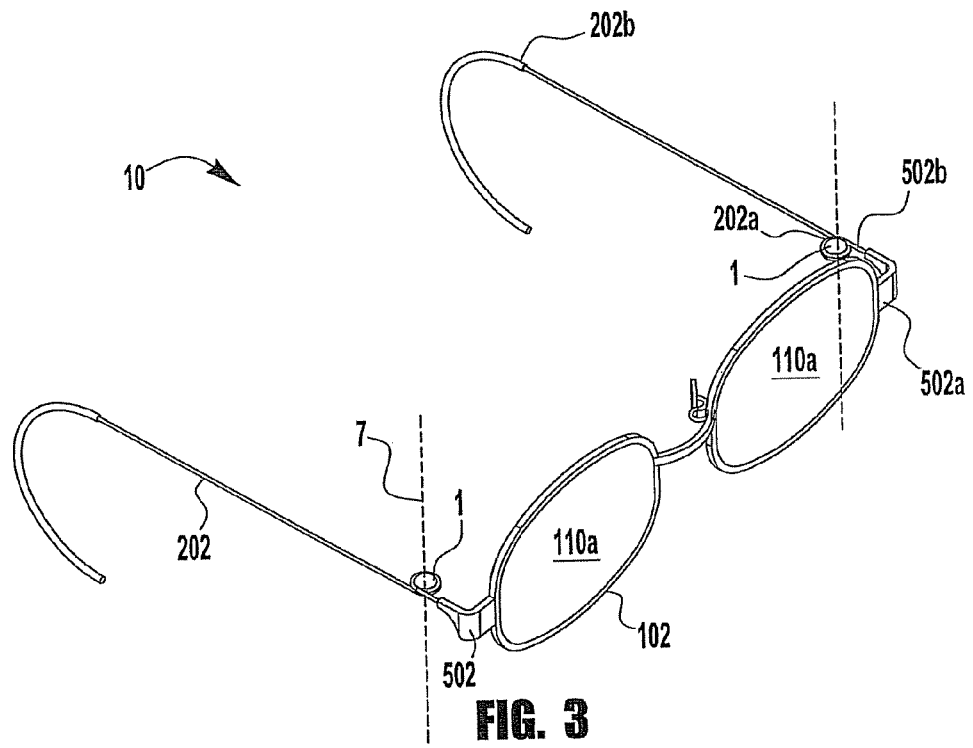

The present invention provides a magnetic connector 1 for use at connection points in eyewear 10. Magnetic connector 1 minimizes damage to eyewear 10 when a component or member 2 of the eyewear is bent or tensioned by causing adjacent members 2 to easily detach when magnets 3 are not in substantial proximity to each other such as when angle α between members is greater than about 110°. In other examples, magnetic connector 1 provides fashion eyewear that has interchangeable members, for example, members having different prints, colors, or designs to provide eyewear having a variety of aesthetic appearances. In another example, magnetic connector 1 provides an easy way to repair eyewear, such as by replacing a member, for example when member is damaged. Magnetic connector 1 eliminates the need for conventional connectors such as screw hinges and enables members 2 of eyewear 10 to be substantially connected to each other by the magnetic force between magnets 3 comprising the magnetic connector 1.

Additionally, in examples, magnets 3 comprising magnetic connector 1 keep connected members 2 substantially aligned. For example, pairs of magnets 3 that are substantially rectangular are substantially self-righting and generally return to a substantially parallel planar arrangement even when magnets 3 are forced apart by pressure on one of magnets 3. Magnets 3 preferably self-align when pressure is removed. In another example, magnetic connector 1 comprises a flexible hinge bar 30 and a means for limiting rotation (described below) that limit the range of rotation of magnets about axis 7 and that impart flexibility to member 2 when member 2 is rotated about axis 7 such that angle α is about 90-150° and that cause magnets 3 to disengage when angle α is greater than about 150°, thereby allowing members 2 to disengage without damage and allowing subsequent reattachment.

As shown generally in the figures, magnetic connectors 1 may be located substantially near any connection point on eyewear 10 between two or more members 2 of the eyewear. In an example, magnets are positioned in or on substantially adjacent ends of members, such as between the eyewire 102 and the temple bar 202, frame front 502 and temple bar 202, and/or on ends of eyewire 102. In another example, magnets 3 are positioned in or on surfaces of adjacent members, such as between nose pad 402a and nose pad arm 402b or between nose pad arm 402b and eyewire 102. The skilled artisan will appreciate, however, that these examples are not intended to be limiting and that magnetic connectors may 1 be provided at any point of connection on eyewear 10. Further, the claimed invention may include magnetic connectors 1 used on any type or style of eyewear 10, including for examples corrective eyeglasses, protective eyewear, sunglasses, fashion eyewear, or banded eyewear. Members 2 are made of any material known in the art of eyeglasses, including for examples rimless, semi-rimless, drilled rimless, plastic, nylon, rubber, polycarbonate, horn rim, aluminum, titanium, stainless steel, other metals, or a combination thereof. In examples, the lens/interface with eyewear is rimless, drilled rimless, semi-rimless, flat beveled, v-beveled, or other types of bevels.

Figure 13A:
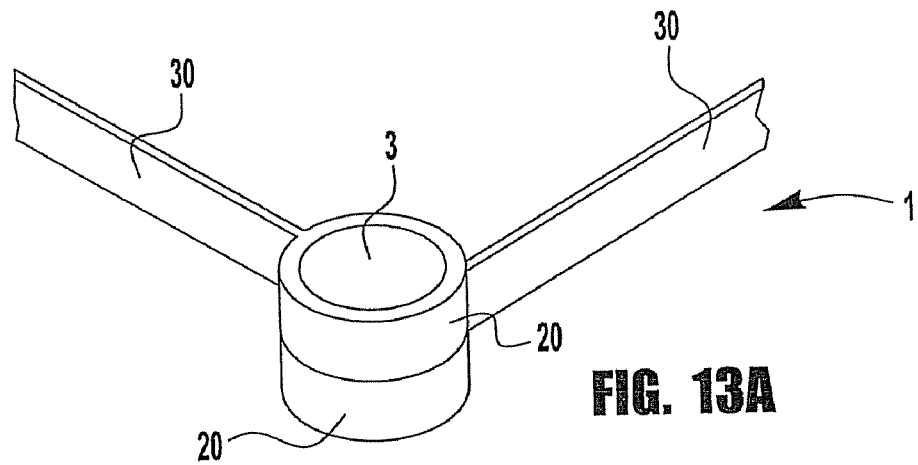
FIG. 13A shows a perspective view of an example of a magnetic connector comprising a housing.

As shown generally in the figures, and particularly in FIGS. 9-12, 17, 19, 20, 24, and 26-33, magnetic connector 1 comprises two magnets 3. As described in more detail below, magnets 3 are either directly attached to members 2 by being positioned in or on members (FIGS. 9-12, 17, 19, 20, and 26-33) or are indirectly attached to members 2 by being housed in a housing 20 that is attached to member 2 (FIGS. 13 and 24). Magnets 3 are positioned in a plane substantially parallel to each other and rotate about an axis 7. In an example, magnets 3 are positioned in a horizontal plane. In another example, magnets 3 are positioned in a vertical plane. In an example, the magnets 3 have substantially opposite polarities and when magnets are in proximity to each other, a magnetic field of attraction is created that pulls magnets 3 and consequently members 2 towards each other. In use, during most or all of the wearing experience, magnets 3 are in sufficient proximity to each other to create the magnetic field of attraction. The closer magnets 3 are to being in substantial contact, the greater the strength of magnetic attraction therebetween. As magnets 3 move apart, magnetic strength is substantially reduced.

Figure 9A:
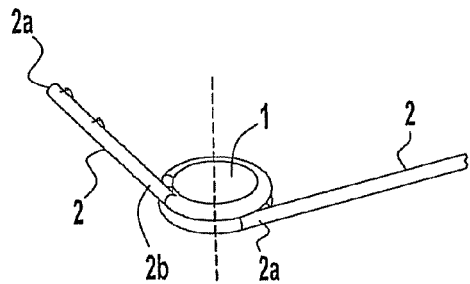
FIG. 9 shows a perspective view of an example of an embodiment of the claimed magnetic connector in which magnets are positioned parallel to each other in a horizontal plane.
Figure 9B:
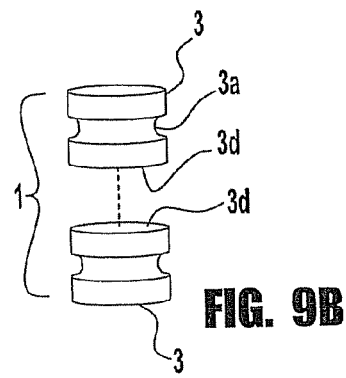
Figure 10:
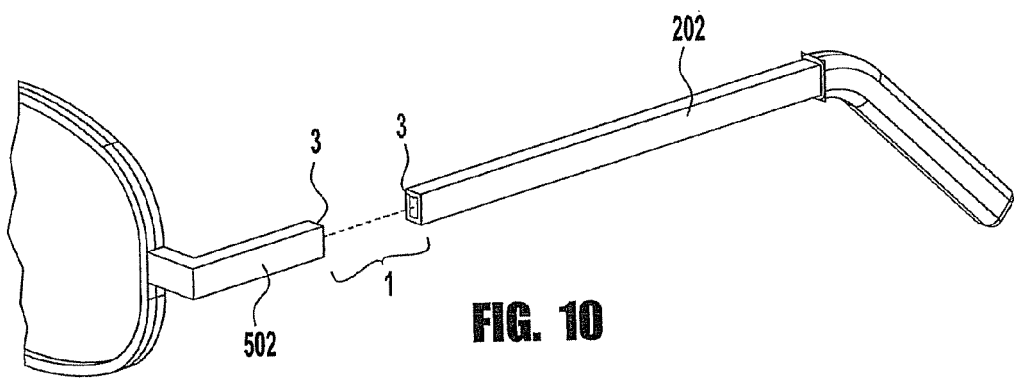
FIG. 10 shows an exploded perspective view of an example of an embodiment of the claimed magnetic connector in which magnets are positioned parallel to each other in a vertical plane.

Preferably, magnets 3 are as strong and as small as possible, but may be of any shape, size, or strength that does not interfere with the functionality of the claimed invention. Magnets 3 are selected based on the dimensions, design, function, and/or aesthetic qualities of the eyewear in which they are used. Examples of shapes include but are not limited to, torus, triangular or rectangular pyramidal, disc-shaped, tetrahedronal, cylindrical, conical, or spherical. In an example, substantially rectangular magnets self-align as described above. Magnets 3 are made of any material known in the art and in a preferred example are made of neodymium, the strongest magnets available today. In other examples, magnets 3 are constructed of Samarium Cobalt or other ferrous material. Examples of magnet shapes include round, square, or rectangular, but are not limited as such. In an example, a square magnet has dimensions ranging from about 2.25 mm×2.25 mm×1.5 to about 3.75 mm×3.75 mm×2.5 mm, and preferably about 3 mm×3 mm×2 mm. In another example, a disc-shaped magnet has dimensions ranging from about 3 mm×1.2 mm to about 5 mm×2 mm, and preferably about 4 mm×1.6 mm. Optionally, magnet has a groove or undercut 3a machined or drilled around circumference of magnet 3, as shown in FIG. 9B. Magnets 3 have a variety of properties, including for examples, a residual flux density ranging from about 10.3 to about 17.8 kilogauss (KGs), and in preferably ranging from about 13.8 to about 14.2 KGs. In an example, magnets have a coercive force of greater than about 7.9 kiloOersteds (Koe), and in a preferred example of greater than about 10.5 Koe. In an example, the intrinsic coercive force (Hcb) is greater than about 8.25 Koe, and in a preferred example is greater than about 11 Koe. In an example, the maximum energy product ($BH_{max}$) ranges from about 34.5 to about 60 Mega Gauss Oersteds (MGOe), and in a preferred example ranges from about 46-48 MGOe.

Magnets 3 are positioned in or on members 2 directly or indirectly using any means known to those skilled in the art. Magnets 3 are positioned substantially parallel to each other in either a horizontal (FIGS. 1-6, 24) or vertical (FIGS. 7-8, 10, 17, 19, 20, 34) plane in or on members. In another example, magnets 3 are positioned side-by-side (not shown). In an example shown in FIG. 19A, magnets are substantially engaged when an angle α between adjacent members 2 is between about 0° and 110° and magnets 3 are substantially disengaged when angle α' is greater than about 110°.

The means of positioning magnets 21, 22 may be determined, at least in part, by the materials from which members 2 are made and by the properties of the magnets 3 themselves. The skilled artisan will appreciate that magnets 3 may be positioned anywhere in or on members 2 as long as members 2 are in sufficient proximity to create a magnetic field therebetween such as substantially near a point of connection between members 2. In an example shown in FIG. 17, magnets are embedded in members 2 such as by inserting and securing magnets into a machined hole. In another example shown in FIGS. 26-27, magnets are sintered and compressed around members. In other examples, magnets 3 are physically attached or connected to an outer surface of member 2, such as by adhering magnets 3 by glue or epoxy, bolts, rivets, screws, or clasps. In yet another example, member 2 is heat treated to soften the material from which member 2 is made to allow magnet to be compressed therein, provided that precautions are taken to use magnets 3 appropriate for heat treatment and/or to ensure that reduced magnetic function resulting from heat treatment is not detrimental to the functionality of the magnets 3. Those skilled in the art of magnets will understand and appreciate that heat treatment of magnets affects magnets in unique ways.

Figure 11:
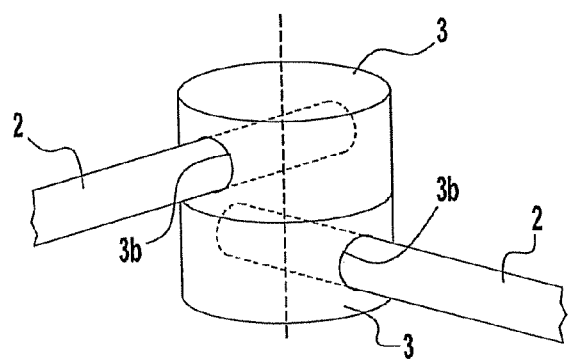
FIG. 11 shows a perspective view of an example of an embodiment of the claimed magnetic connector in which magnets are positioned parallel to each other in a horizontal plane and members of eyewear are secured in holes in magnets.
Figure 12A:
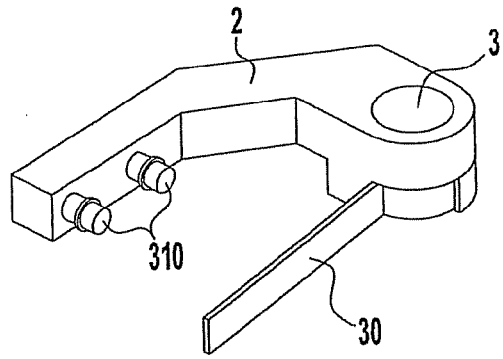
FIGS. 12A-12C show perspective view of examples of a magnetic connector comprising a housing and in combination with a member.
Figure 12B:
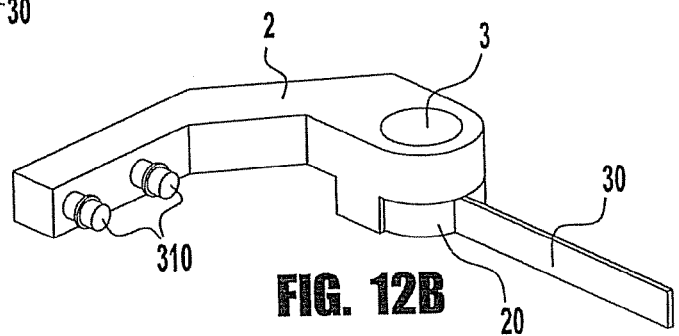
Figure 12C:
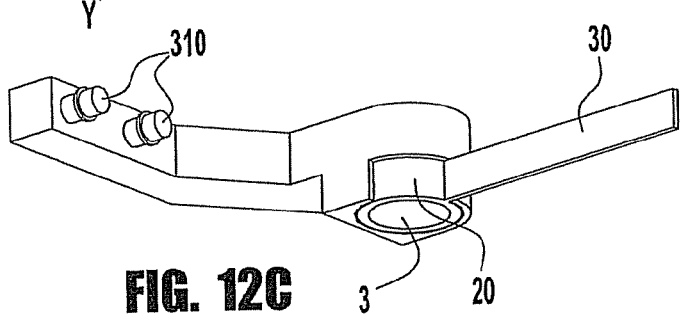
Figure 12D:
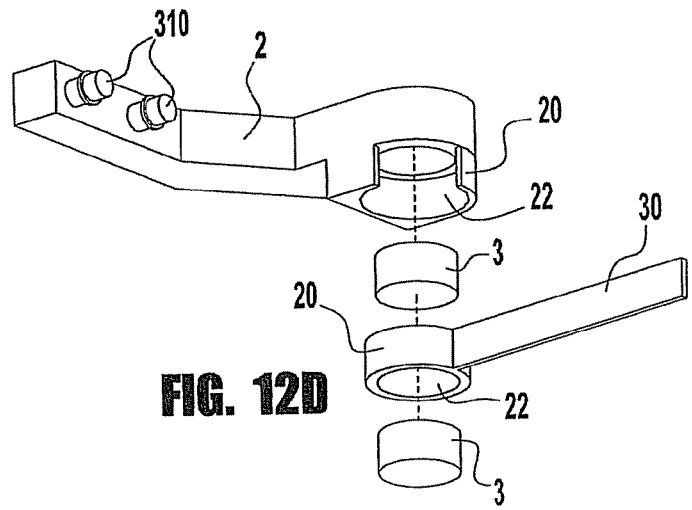
FIG. 12D shows an exploded perspective view of an example of a magnetic connector comprising a housing and in combination with a member.
Figure 30:
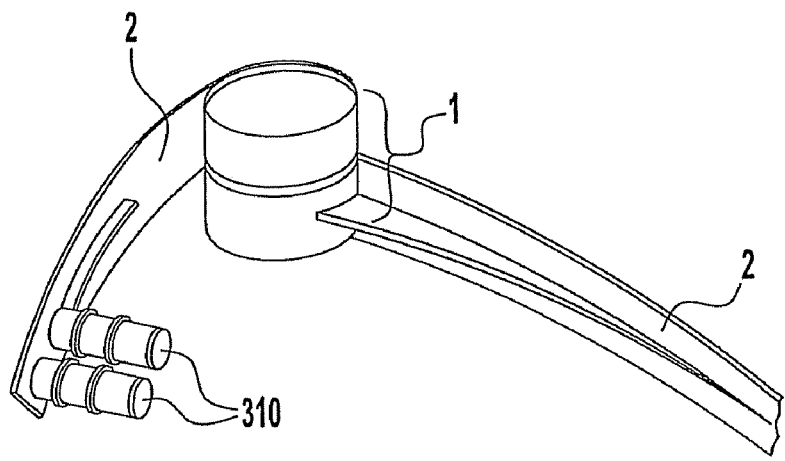
FIG. 30 shows a perspective view of an example of a member mechanically attached to magnet.
Figure 31:
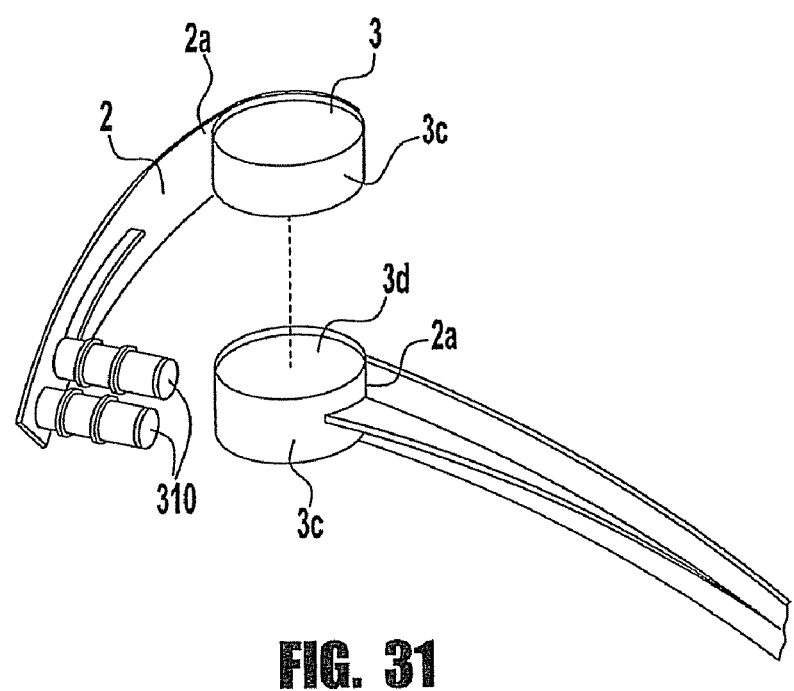
FIG. 31 shows an exploded perspective view of an example of a member mechanically attached to magnet.

In another example shown in FIG. 11, members 2 are inserted into holes 3b cross-drilled into magnets 3. Member 2 may be secured in hole 3b by any means of securing known to those skilled in the art, including pressure mounting, glue, or mechanical means. In other examples, members 2 or a part or region thereof, such as ends of members 2a, 2b, are shaped and configured to complement a shape and size of magnet 3 to mechanically engage and secure magnets 3 thereto. For example, one of ends of member 2a, 2b are flattened and/or wrapped around the perimeter surface 3c of the magnets, as shown in FIGS. 30-31. In another example shown in FIG. 9, a groove 3a is machined or sculpted into the perimeter surface 3c of magnet, and member 2 sits snugly in the groove 3a and wraps around magnet 2, to secure member 2 thereto.

Figure 13B:
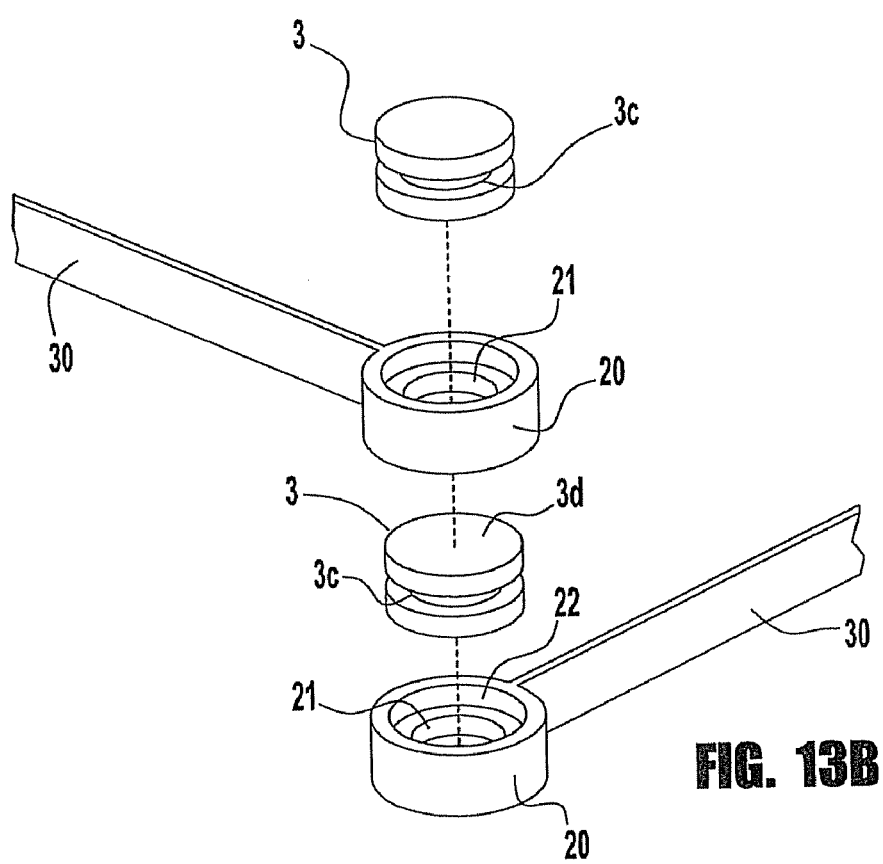
FIG. 13B shows an exploded perspective view of an example of a magnetic connector comprising a housing.
Figure 14:
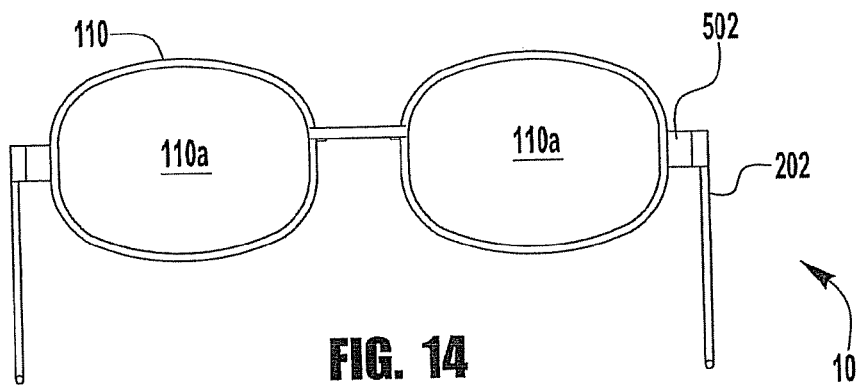
FIG. 14 shows a front view of an example of an embodiment of the claimed magnetic connector in combination with eyewear.
Figure 15:
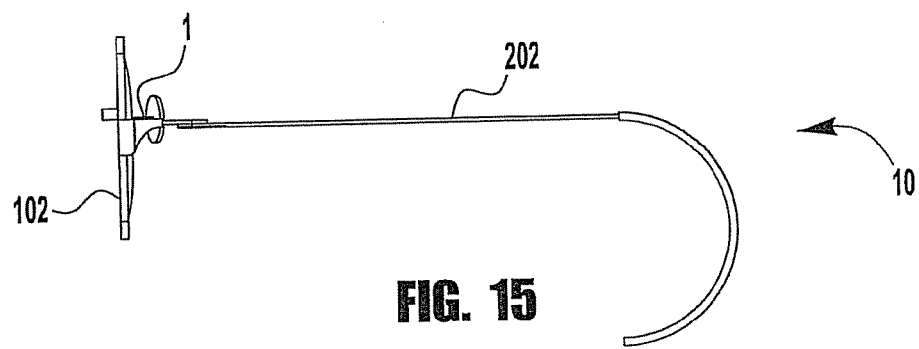
FIG. 15 shows a side view of an example of an embodiment of the claimed magnetic connector in combination with eyewear in which magnets are positioned parallel to each other in a vertical plane.
Figure 16:
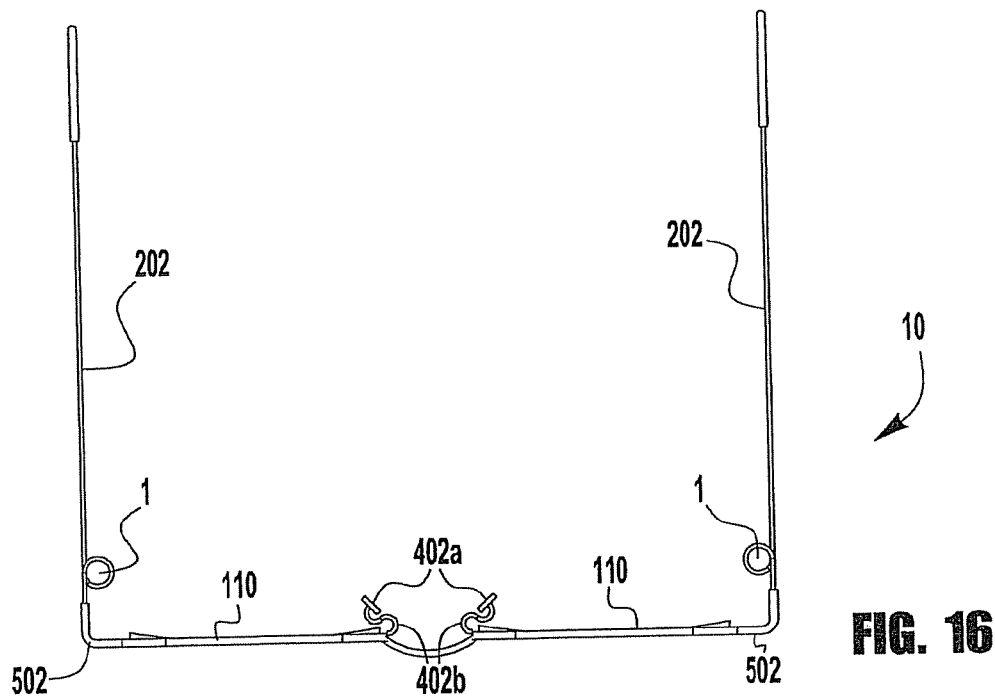
FIG. 16 shows a top view of an example of an embodiment of the claimed magnetic connector in combination with eyewear in which magnets are positioned parallel to each other in a horizontal plane.
Figure 24A:
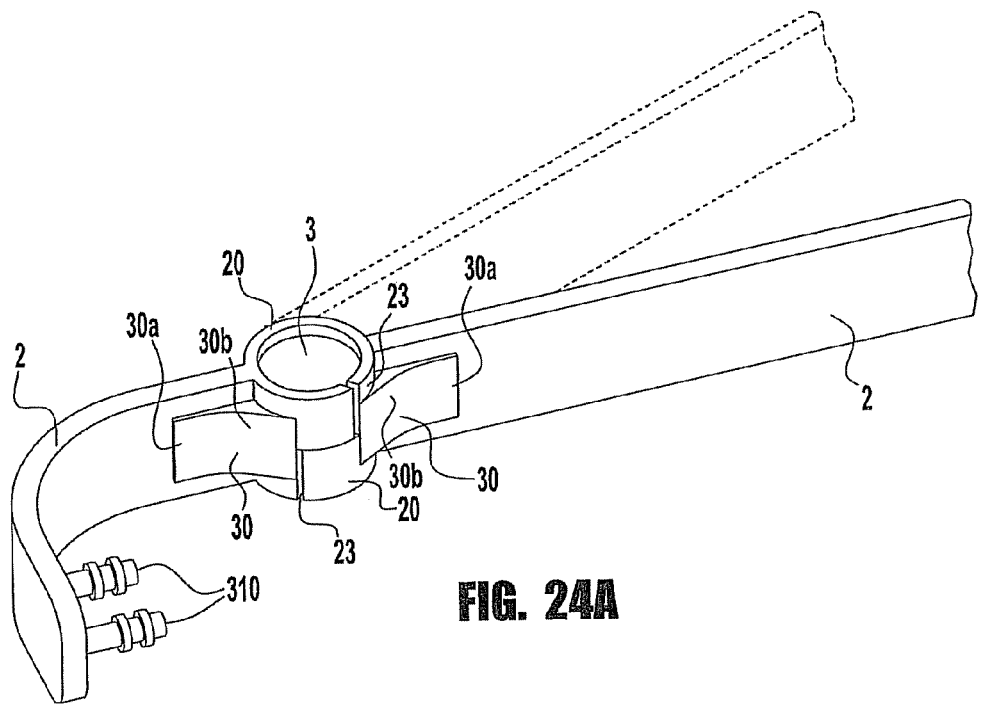
FIG. 24 shows examples of an embodiment of the claimed magnetic connector comprising a flexible tension bar and a means for limiting rotation.
Figure 24B:
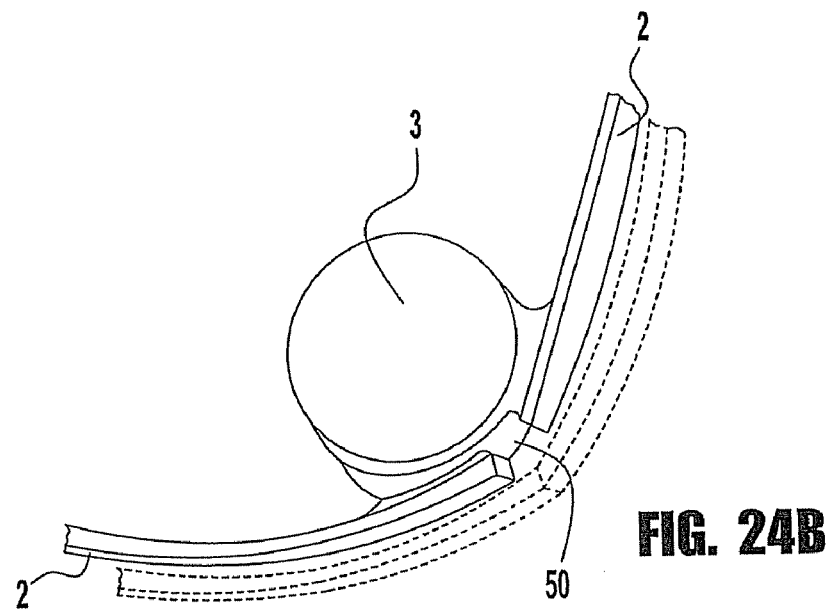
Figure 24C:
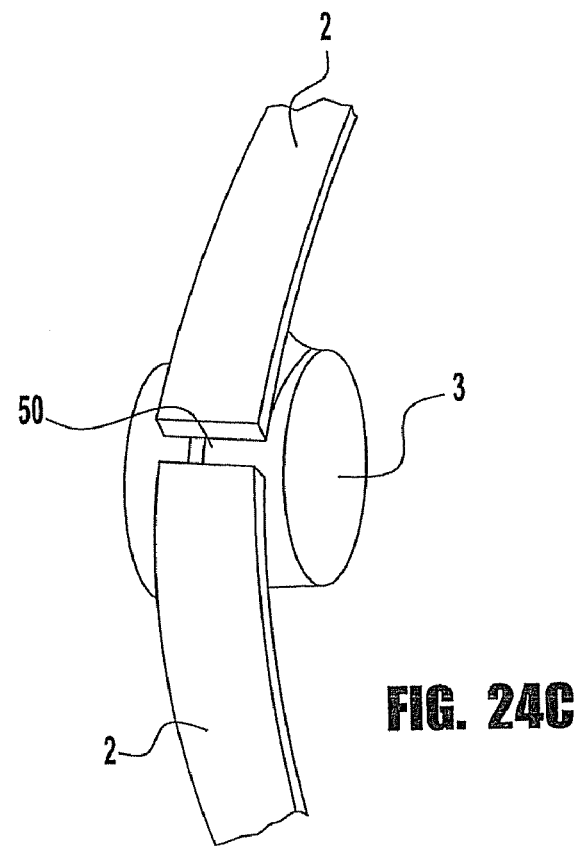
Figure 25A:
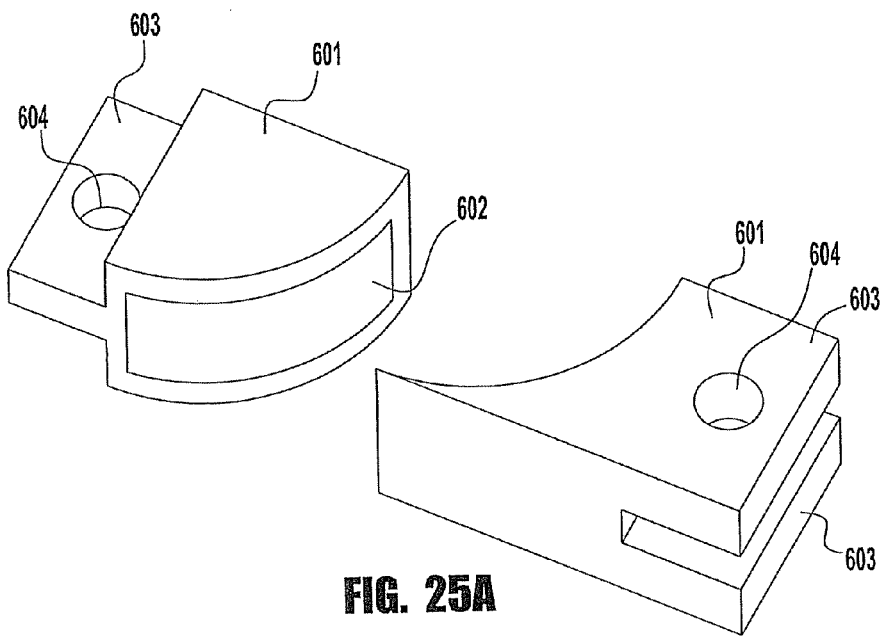
FIG. 25 shows perspective views of examples of an embodiment of the adapter pieces of the magnetic hinge adapter.
Figure 25B:
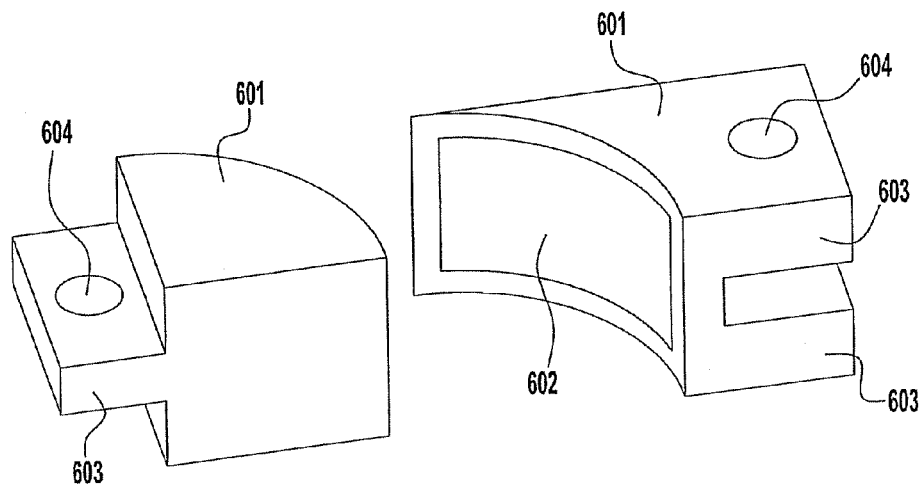

In other examples shown in FIGS. 13 and 24, magnetic connector 1 further comprises at least one housing 20 that is attached to members 2 and that houses at least one magnet 3 so that magnet is indirectly attached to corresponding member. In examples, housing 20 is made from epoxy, polymer, organic material, metal, plastic, rubber, or the like. Preferably, housing 20 is soldered, welded, glued, epoxied, or otherwise permanently attached to member 2. Housing 20 may be used at any point of connection and in combination with any other feature described herein. The advantage of housing magnets in a housing 20 is that housing 20 eliminates the need for exposing magnets 3 to treatments that potentially reduce magnetic strength because housings 20 are exposed to those treatments before magnets 3 are inserted therein, thereby protecting magnets 3 and maintaining magnetic strength. Materials from which housing 20 is made are preferably selected to be able to withstand any treatments that housing will be subjected to during attachment to members. Housing 20 also protects the physical structure of magnets 3, such as by maintaining the physical integrity of magnets by inducing pressure on magnets 3 and constraining pieces from separation or deformity should magnets 3 become damaged, such as fracture or decomposition. In an example, housing 20 is of a shape and size substantially complementary to magnet 3. In a preferred example, magnet 3 has a groove or undercut 3a as shown in FIG. 13B that extends around the circumference of magnet. Inner wall of housing 22 has a tongue 21 that substantially fits within groove 3a to hold or secure magnet 3 in housing. In another example shown in FIG. 24A, housing 20 comprises an expansion joint 23 that expands the diameter of housing 20 when magnets 3 are inserted therein. Optionally, housing 20 is sized to hold more than one magnet 3.

Magnets have opposing surfaces 3d that are complementary to each other. In examples where magnets 3 are positioned on members 2, opposing surfaces 3d substantially contact each other when members 2 are substantially adjacent. In an example shown in FIG. 17B, magnets 3 are positioned in members 2 and opposing surfaces 3d do not directly contact each other because magnets 3 in adjacent members 2 are separated by at least a layer of material from which member 2 is made. In this example, layer is of a thickness that allows magnetic polarities to penetrate to create a magnetic field when magnets are positioned in sufficient proximity to each other to create a magnetic field.

Figure 19A:
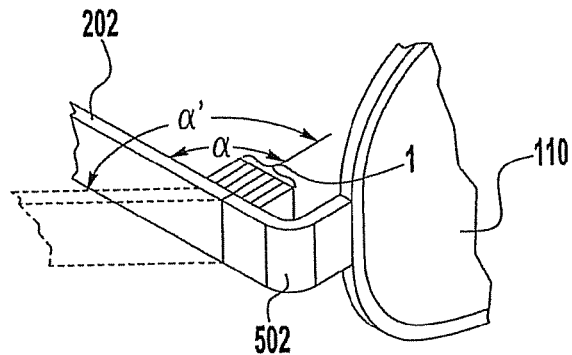
FIG. 19 shows perspective views of examples of the claimed magnetic connector in combination with eyewear.
Figure 19B:
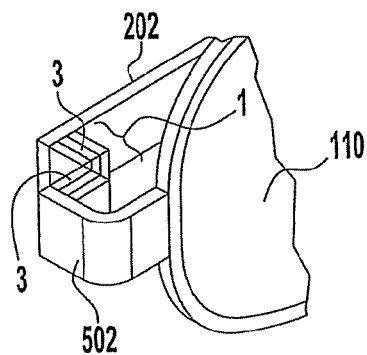

Opposing surfaces 3d can be flat, stepped, or curved. The degree of curvature of opposing surface 3d may be determined or chosen based on the intended use, style or design of eyewear 10. In an example, opposing surfaces 3d are substantially flat, as shown in the examples in FIGS. 1-9 and 19. As shown in FIG. 19A, members 2 are substantially adjacent when opposing surfaces of flat magnets 3d are substantially engaged, such as when angle α is between about 0° (FIG. 19B) and 90° (FIG. 19A). Magnets 3 having a flat opposing surface 3d provide magnetic connector 20 with stability and rigidity.

Figure 20A:
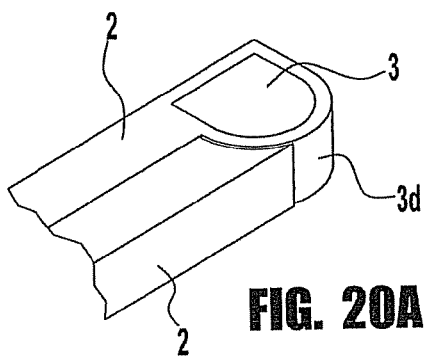
FIG. 20 shows perspective views of examples of the claimed magnetic connector positioned on members.
Figure 20B:
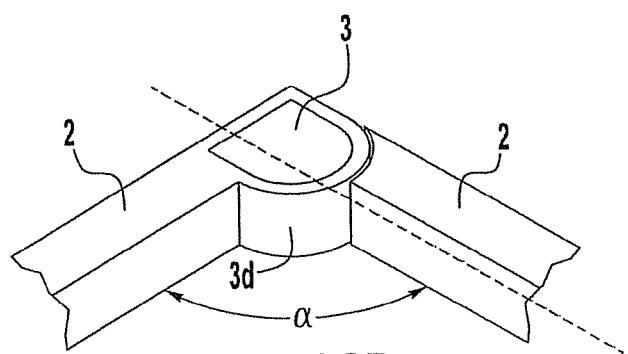

In another example, opposing surfaces of magnets 3d have complementary curvatures, such as where opposing surface of one magnet 3d is slightly concave and opposing surface of the other magnet 3d is slightly convex, as shown in FIG. 20.

Concave and convex opposing surfaces 3d are substantially engaged when members 2 are substantially adjacent. At least one magnet 3 rotates about axis 7 to thereby rotate adjacent member 2.

Figure 32:
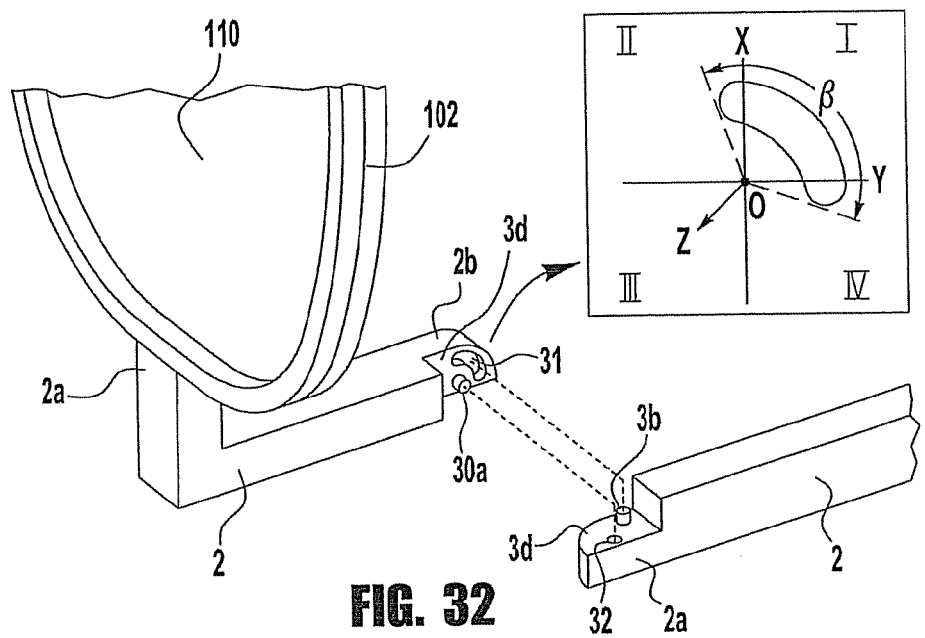
FIG. 32 shows an exploded perspective view of an example of an embodiment of the magnetic connector comprising a means for limiting rotation.

In another example shown in FIGS. 17 and 32, end 2a of one member has a step 15a and end 2b of other member has an inverted step 15b. Magnets 3 are positioned in or on ends 2a of members, so that when step 15a and inverted step 15b substantially align and are substantially adjacent, magnets 3 are positioned in sufficient proximity to each other to create a magnetic field of attraction that substantially connects members 2. In an example, step and inverted step 15a, 15b limit range of rotation of magnet 3 about axis 7.

Another example of the step 1 inverted step 15a, 15b, is shown in FIG. 18, which shows an example of disc-shaped magnet 3 comprising a step 15a and an inverted step.

In the example shown, opposing surface 3d of one magnet has a step 15a and opposing surface 3d of the other magnet has an inverted step 15b that substantially contacts step 15a when magnet 3 rotates about axis 7. Step 15a and inverted step 15b may be either machined or extruded. The skilled artisan will understand that step 15a and inverted step 15b may be any shape, although preferably one of step and inverted step 15a, 15b is substantially semicircular and the other of step and inverted step 15a, 15b is substantially pie-shaped, having an angle γ, where γ is preferably about 90°. Each of step 15a and inverted step 15b has first and second contacting surfaces. When first contacting surfaces are in substantial contact, one magnet 3 is at about 0° relative to other magnet 3. When second contacting surfaces are in substantial contact, one of magnets 3 has rotated about 90° relative to other magnet. Contacting surfaces thereby substantially limit range of rotation of magnet 3 about axis 7. When magnet 3 rotates beyond about 90° to about 110°, magnets 3 partially disengage, causing members 2 to partially disengage. When magnet 3 rotates more than about 110°, members 2 detach, thereby providing flexibility and resistance to permanent breakage caused by bending or pressure at the point of connection between members 2. The detachability and ability to subsequently reattach at connection points is novel compared to the prior art.

Optionally, magnetic connector 1 further comprises a means for limiting the range of rotation to restrict motion or to prevent 360° rotation of magnets 3 about an axis 7 and to provide members 2 with better self-righting capabilities relative to other members 2. Preferably, means for limiting range of rotation is on opposing surface 3d. Examples of means for limiting the range of rotation are shown in FIGS. 18 and 32. As shown in FIG. 32, opposing surface 3d of one magnet has a protrusion 30a and opposing surface 3d of other magnet has a protrusion 30b and an indented pivot point 32. Groove is generally concentric to protrusion 30a and groove 31 that is generally semi-circular. Protrusion 30a is aligned with pivot point 32 and protrusion 30b is aligned with groove 31. The pivot point 32 lays on the Origin O of the X, Y, and Z axes. The groove 31 enables member 2 to rotate about the Z axis anywhere within Quadrant I, about 30° to the left of the Y axis in Quadrant II, and about 30° below the X axis in Quadrant IV, as shown by angle β in FIG. 32. When rotation into Quadrants II or IV exceeds about 30° to the left of the Y axis or about 30° below the X axis, respectively, protrusion 30b detaches from the groove 31 and protrusion 30a either rotates freely about pivot point 32 or becomes detached from pivot point 32 so that member 2 detaches from other member 2. In the example shown, member 2 never rotates into Quadrant III because protrusion 30b detaches from groove 31, thereby providing flexibility to withstand breakage caused by bending or pressure at the point of connection between members 2.

Another means of limiting rotation is shown in FIG. 24. Magnetic connector 1 further comprises at least one flexible tension bar or gate 30 that is attached to or integral with at least one of member 2. In a preferred example, magnetic connector 1 comprises two flexible tension bar 30, one flexible tension bar attached to or integral with one member 2 and the other bar attached to or integral with the other member. In examples, flexible tension bar 30 is made of the same material from which member 2 is made or is made from a different material and is preferably a nonrigid material. For examples, flexible tension bar 30 is made from beta-titanium. Preferably, first end of tension bar 30a has a smaller width than second end 30b to impart flexibility to tension bar 30 itself in addition to providing flexibility to members 2. Preferably, flexible bar 30 is flexible enough that it flexes about 10-20° from resting position. In the example shown, second end of flexible tension bar is adjacent to perimeter surface of magnet 3c or housing 20. In a preferred example, tension bar 30 is used in combination with means for limiting rotation such as the one shown in FIG. 24B. Means for limiting rotation may be any means that limits rotation of magnets about axis 7. In the example shown, there is a space 50 between members such that ends of members 2a, 2b do not substantially touch until pressure or force is exerted against members 2. When pressure or force is exerted against members 2, magnets 3 rotate about axis 7 causing ends of members 2a, 2b to substantially engage each other. When ends of members 2a, 2d substantially engage each other, members 2 will disengage and break away when magnets 3 rotate greater than about 110°. If pressure is reduced before disengagement of magnets 3, magnetic tension bar will act as a spring that will re-align magnets 3 and members 2.

In addition to preventing magnets 3 from rotating 360° about axis 7, means for limiting rotation also imparts to magnets self-alignment such that if pressure or force is exerted against magnets 3, magnets will substantially re-align so that members 2 are also substantially re-aligned when pressure or force is removed.

Optionally, one of magnets 3 is a magnetically reactive surface such that the other magnet 3 is attracted thereto. In this embodiment, magnet 3 is of a size and strength to attach to magnetically reactive surface while at the same time having a strength that does not interfere with the functionality of the claimed invention. Preferably, magnetically attractive material must have a degree of attractiveness that is substantially similar to that of magnets 3, and must have a magnetic strength to weight ratio that is substantially similar to the ratio found in connectors comprising a pair of magnets 3.

Optionally there is a protective layer (not shown) to protect the magnets 3 and/or opposing surfaces 3d from wear and corrosion caused by contact and frictional engagement. Protective layer is either directly applied to opposing surface of magnet 3d in examples where magnet 3 is positioned on members 2 or applied to an area of members in which magnets are embedded. For examples, the protective layer may be rubber, plastic, metal, oil, or a cushion means positioned between magnets. In an example, the thickness of the protective layer ranges from about 0.2 mm to about 0.5 mm. However, the protective layer must not be so thick that it interferes with the magnetic capabilities of the claimed invention.

Figure 23:
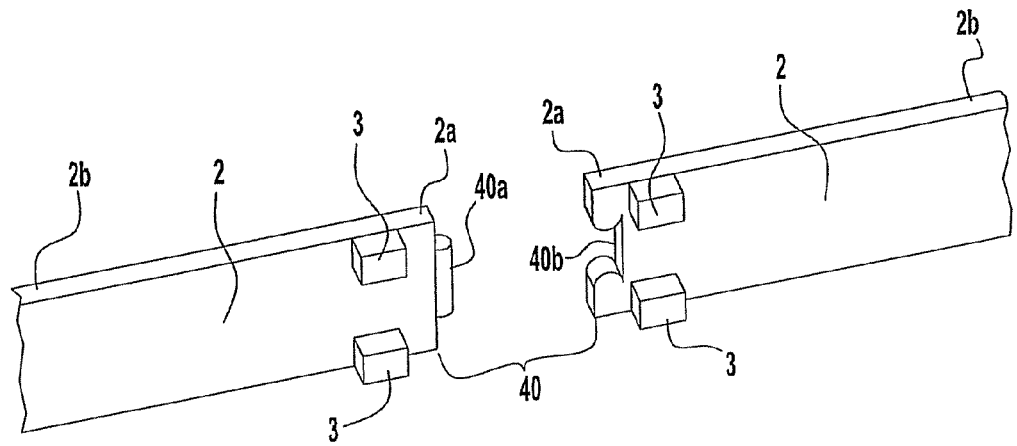
FIG. 23 shows a perspective view of an example of an embodiment of the claimed magnetic connector comprising the locking mechanism.

Optionally, each magnet 3 comprises more than one magnet, as shown in FIG. 19. Magnets 3 comprising multiple magnets are positioned substantially parallel to each other in a plane. Multiple magnets are either in direct contact with each other as shown in FIG. 19 or may be spaced apart from each other as shown in FIG. 23. In examples, magnets 3 are in a horizontal or vertical plane. In an example, magnets 3 comprising more than one magnet are attracted to each other by an attractive force created when multiple magnets are in substantial proximity to each other. In another example, magnets 3 comprising more than one magnet are permanently affixed to each other, such as by glue or epoxy. As increasing numbers of magnets comprise magnets, the magnetic strength of magnetic connector 1 also increases. Therefore, in an example, intended use or function of the eyewear 10 comprising magnetic connector 1 may determine the number of magnets comprising each magnet 3.

In another embodiment, the invention is a magnetic connector 1 comprising first and second magnets 3 of substantially the same polarity. Magnetic connectors 1 may have any of the features described above and are positioned in or on members of eyewear 10. Magnetic connector 1 further comprises a locking mechanism 40 that locks members 2 together, as shown in FIG. 23. Locking mechanism 40 comprises two parts 40a, 40b, one located on one member and the other located on the other member. When locking member 40 is substantially engaged and magnets 3 are positioned in proximity to each other sufficient to create a field of magnetic repulsion, members 2 are pushed away from each other and a tension is created that secures the locking mechanism 40, thereby securing the connection of first and second members. In an example, locking mechanism is a lock and key configured to engage each other and further secured when magnetic repulsion pushes lock and key into engagement and substantially aligns members in a substantial parallel direction away from each other. In another example, locking mechanism 40 is a hook and latch, the hook hooking the latch and being tensioned when magnetic repulsion pushes members 2 away from each other to secure the connection between members 2 substantially aligning members in a substantially parallel direction. In another example, locking mechanism 40 is a T-bar and hook, the T-bar configured to engage hook and being tensioned when magnetic repulsion pushes members 2 away from each other to secure the connection between members 2, substantially aligning members in a substantial parallel direction.

In another embodiment shown in FIGS. 21-22, the invention is a magnetic hinge adapter 600 for use with eyewear 10 to provide a mechanism for retrofitting the magnetic connector 1 of the present invention into eyewear 10 equipped with conventional connectors 610 such as a miniature screw hinge. The magnetic hinge adapter 600 comprises at least one adapter piece 601 comprising a magnetic surface 602 and at least one platform 603 having a hole 604 therein. Magnetic surface 602 creates a magnetic field of attraction that magnetically connects members 2 of eyewear 10 at connection points.

The adapter piece 601 may be made of any material known to those skilled in the art for use in eyewear 10, including plastic, titanium, aluminum, or any other metal. In an example, the adapter piece 601 comprises a magnetic surface 602. In another example, the entire adapter piece 601 is magnetized. Platform 603 is for mounting adapter piece 601 onto member 2 and is sized and shaped to integrate with the screw hinge 601. Platform 603 has a hole 604 that substantially aligns with a screw hole 614 in the platform 613 of the screw hinge 610 when the platforms 603, 613 are overlapped. Each hole 604, 614 is capable of receiving a securing means 615 such as a rivet that has a diameter sized to substantially fit in the holes 604, 614 in the platforms 603, 613. The securing means 615 may comprise at least one ridge 615a to further secure securing means 615 in holes 604, 614. Securing means 615 may be made of any suitable material, including for examples, plastic or metal.

In an example, magnetic hinge adapter 600 further comprises a second adapter piece 601. Magnetic surfaces 602 of adapter pieces have substantially opposite polarities. The magnetic attractive force between magnetic surfaces 602 of adapter pieces magnetically connects members 2 while eliminating the need for conventional connectors 610 such as screw hinges.

SPECIFIC EXAMPLES

Specific examples of magnetic connector 1 in combination with eyewear 10 are described below and are shown in FIGS. 1-8, 14-16, 26-29, and 33-34. Even where not specifically described, the specific examples described below may incorporate any of the features described above as long as the feature does not interfere with the intended function of the specific eyewear 10.

Magnetic Connector Connecting Frame Fronts and Temple Bars

In the examples shown in FIGS. 1-8, 14-16, and 34, eyewear 10 comprises an eyewire 102 and two sets of member frame fronts 502 magnetically connected to member temple bar 202 by a magnetic connector 1 positioned therebetween. In the examples shown in FIGS. 1-4, 7, 8, 14-16, and 34, frame front 502 is continuous or integral with eyewire 102. In the examples shown, frame fronts 502 are substantially parallel. Each frame front 502 has first and second ends 502a, 502b and is attached at one end to an end of eyewire 102. Each temple bar 202 has first and second ends 2902a, 202b. In the examples shown, member temple bars 202 are in an open or fully extended position such that temple bars 202 are substantially parallel to each other and are about 90° from the plane in which lenses 110 are positioned. Magnets 3 comprising magnetic connector 1 are of substantially opposite polarities. First end of temple bar 202a is substantially adjacent to and aligned with second end of frame front 102b when magnets 3 comprising magnetic connector 1 are substantially aligned and are in sufficient proximity to each other to create a magnetic field of attraction to magnetically connect and align member temple bar 202 and member frame front 502 such that temple bar 202 is maintained in an open position by magnets 3 comprising magnetic connector.

Figure 4:
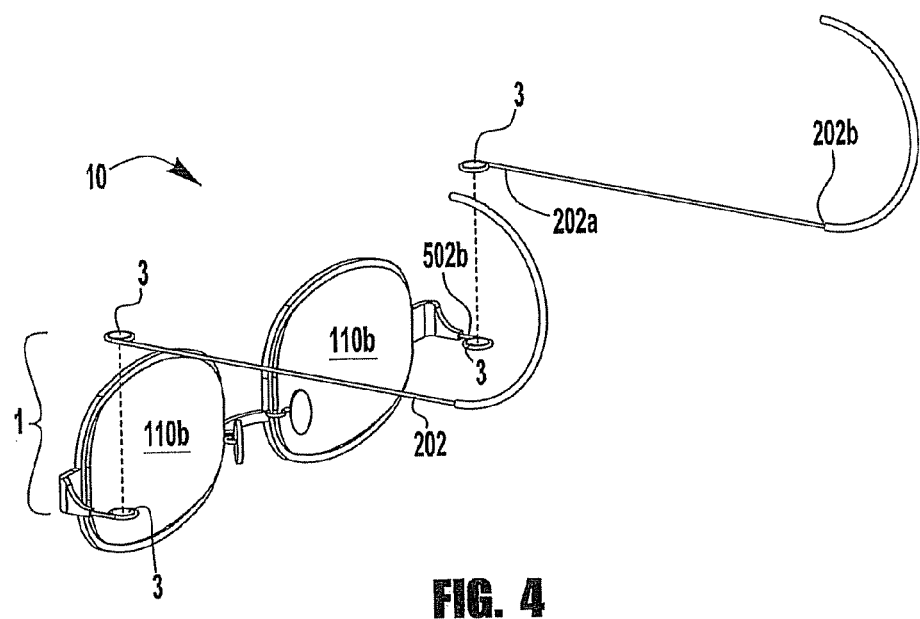
Figure 5:
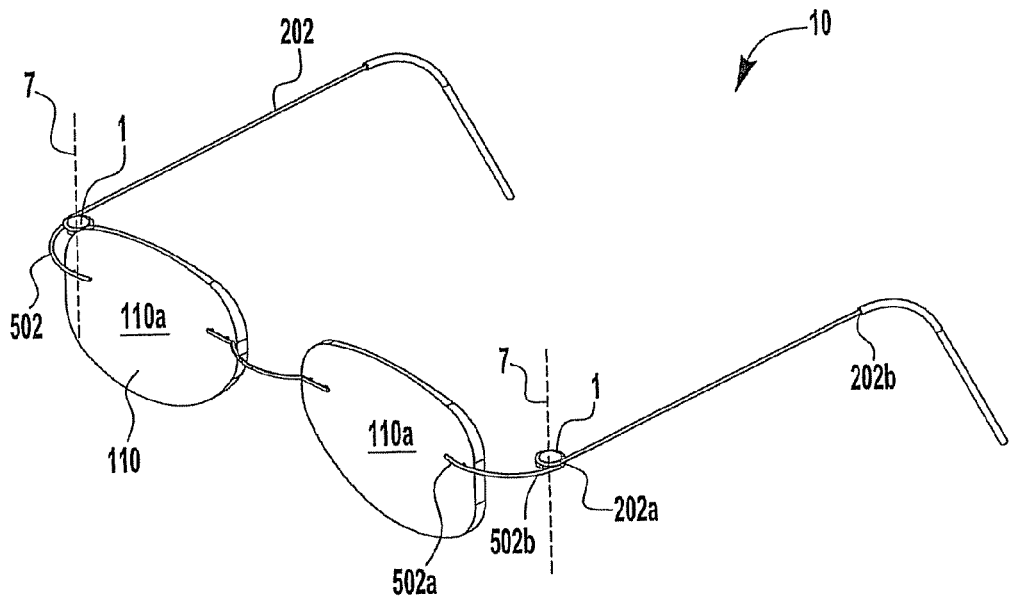
Figure 6:
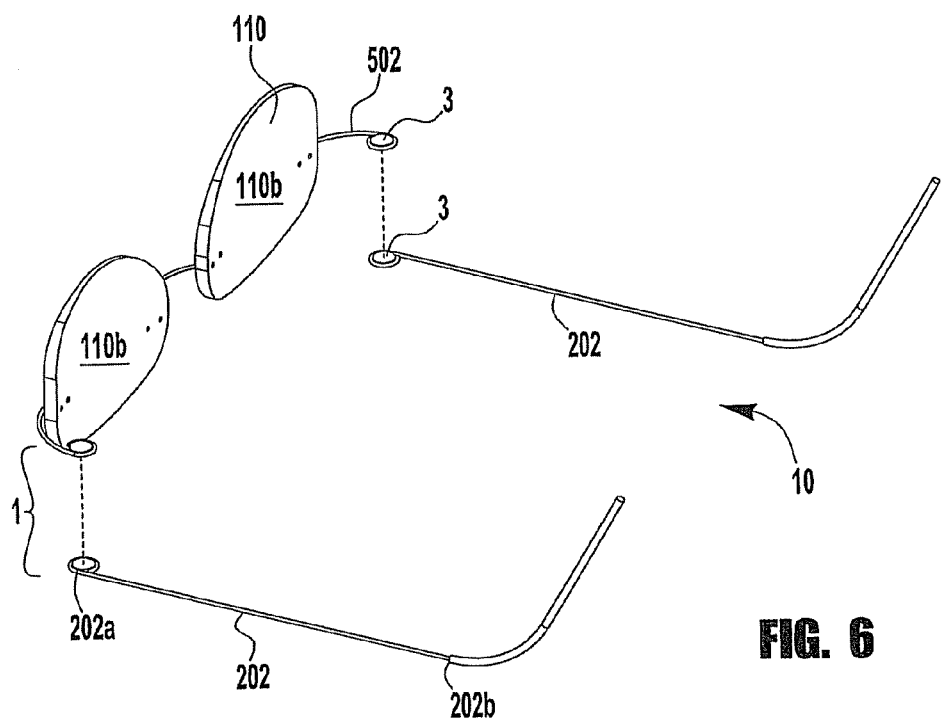

In the examples shown in FIGS. 3, 4, and 14-16, one magnet comprising each magnetic connector 1 is positioned on member temple bar 202 and the other magnet 3 is positioned on frame front 502. FIGS. 3 and 14-16 show different views of eyewear 10 with members temple bars 202 and frame fronts 202 magnetically connected by magnetic connector 1, and FIG. 4 shows temple bars 202 and frame fronts 501 detached. FIG. 4 shows an exploded perspective view of magnetic connector in combination with a pair of eyeglasses 10. First end 202a of temple bar is substantially adjacent to and aligned with second end 502b of frame front when magnets 3 comprising magnetic connector 1 are substantially parallel to each other in a horizontal plane. Magnets 3 are in sufficient proximity that their magnetic fields interact, thereby creating a magnetic field of attraction. The attractive force magnetically connects and aligns member temple bar 202 with member frame front 502 such that temple bar 202 is maintained in the open position.

Figure 7:
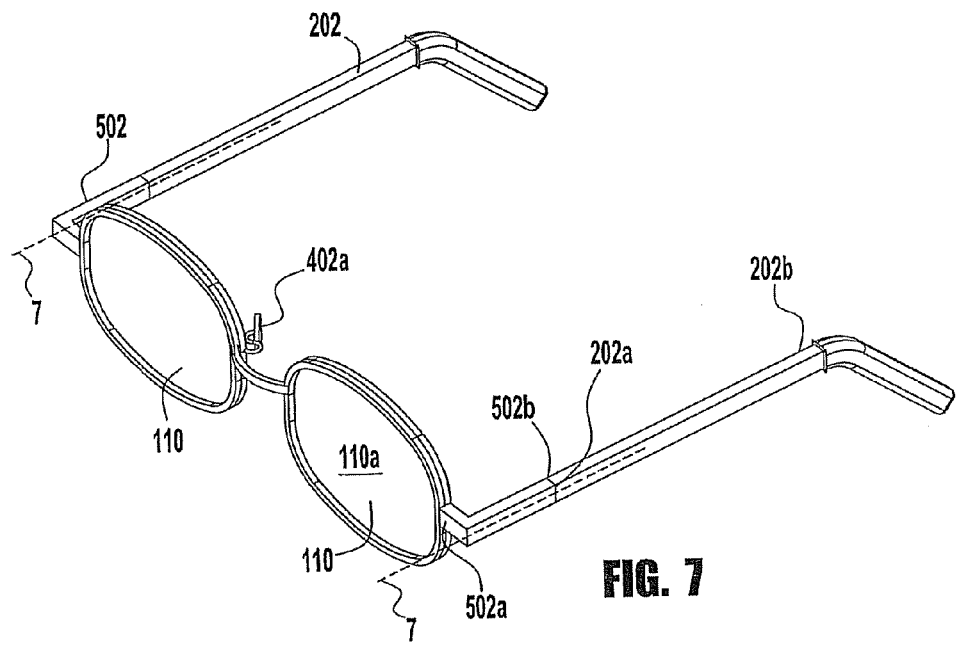
FIG. 7 shows a perspective view of an example of an embodiment of the claimed magnetic connector in combination with eyewear in which magnets are positioned parallel to each other in a vertical plane.
Figure 8:
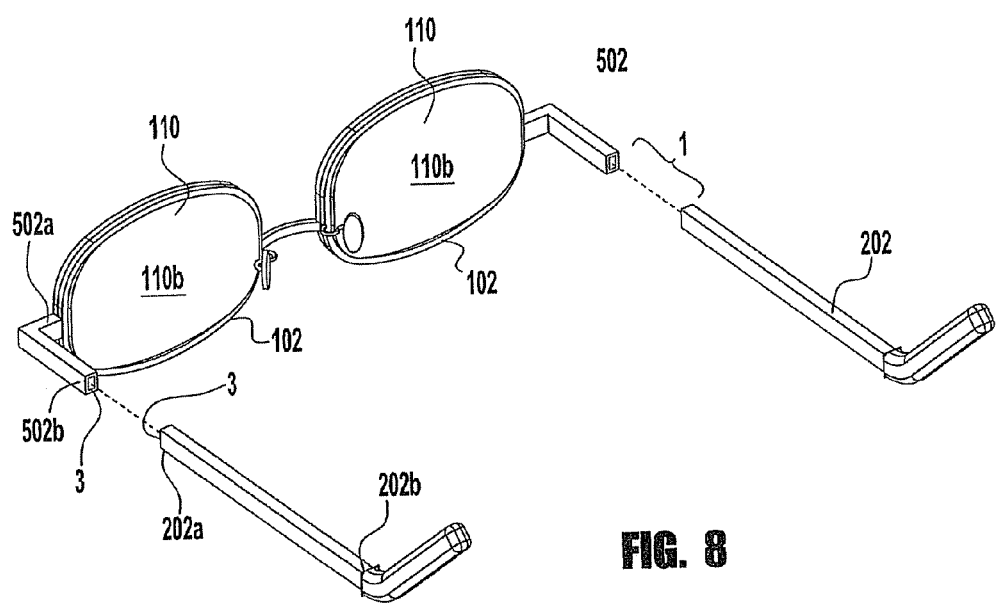
FIG. 8 shows an exploded perspective view of an example of an embodiment of the claimed magnetic connector in combination with eyewear in which magnets are positioned parallel to each other in a vertical plane.

In the examples shown in FIGS. 7, 8, and 34, one magnet 3 comprising each magnetic connector 1 is positioned in member temple bar 202 and the other magnet 3 is positioned in member frame front 502. FIGS. 7 and 34 show perspective views of eyewear 10 with frame fronts 502 and temple bars 202 magnetically connected by magnetic connector 1, and FIG. 8 shows an exploded perspective view showing magnetic connectors 1 between frame fronts 502 and temple bars 202. Magnets 3 are substantially parallel to each other in a vertical plane. First end of temple bar 202a is substantially adjacent to and aligned with second end of frame front 502b when magnets 3 are in sufficient proximity to each other to create a magnetic field of attraction to magnetically connect and align member temple bar 202 with member frame front 502 such that temple bar 202 is open. In an example, first end 502a of frame front is either integral with or attached to eyewire 102.

As shown in the examples, second end of temple bar 202b may be either an L-shaped configuration or a semicircular configuration. The semicircular configuration in combination with the flexible hinge 30 and magnetic connectors 1 described above provides a secure, lightweight eyewear 10 that substantially eliminates the lateral pressure commonly exerted on the temple, ear, or mastoid bone of the wearer by eyewear 10 comprising temple bars 202 with semicircular configurations.

Examples shown in FIGS. 1, 2, 5, and 6, show rimless eyewear in which frame fronts 502 are directly connected to lenses 110 of eyewear 10. FIG. 12 shows an example of a magnetic connector 1 that is magnetically connected to rimless eyewear. Each frame front 502 comprises at least one prong 310 projecting from a surface of frame front 502 near frame front's first end 502a. Examples of prongs and methods of attachment to lenses are generally defined and described in U.S. patent application Ser. No. 11/458,239, filed Jul. 18, 2006. Briefly, prongs 310 are designed to accommodate and fit within or pass through corresponding connecting cavities or holes in lens 110. The connecting cavities or holes are positioned near or about the outer perimeter of lens 110, out of the line of vision of lenses. Insertion of prongs 310 into holes or cavities attaches lenses 110 and frame fronts 502 when prongs 310 are inserted therein. Frame front 502 may either be attached to front 110a or rear surfaces of lenses 110b. When attached to front surfaces 110b, prongs 310 project from a rear surface of frame front 502 through the lenses 110 towards the rear surface of lenses 110b. When attached to rear surfaces of lenses 110b, prongs 310 project from a front surface of frame front through the lenses 110 towards the front surface of lenses 110a.

Figure 37A:
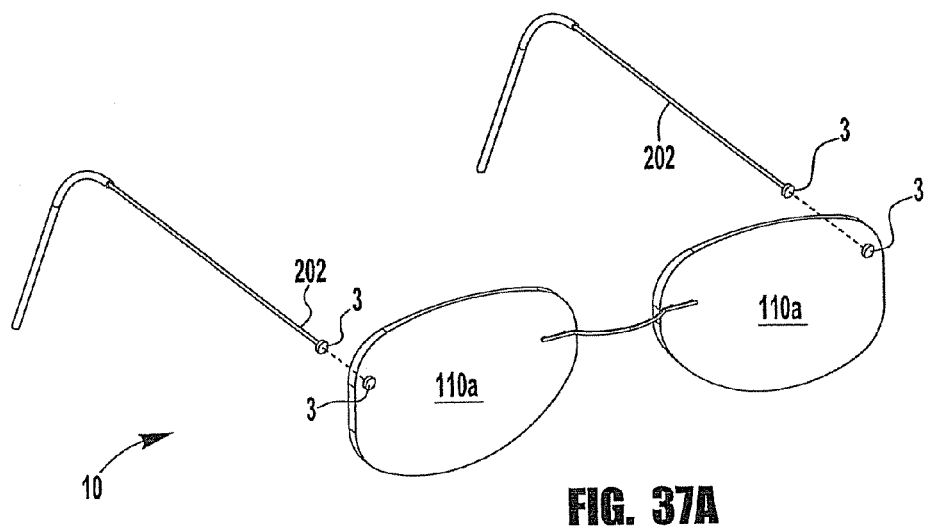
FIG. 37 shows perspective views of examples of an embodiment of the magnetic connector in combination with eyewear.
Figure 37B:
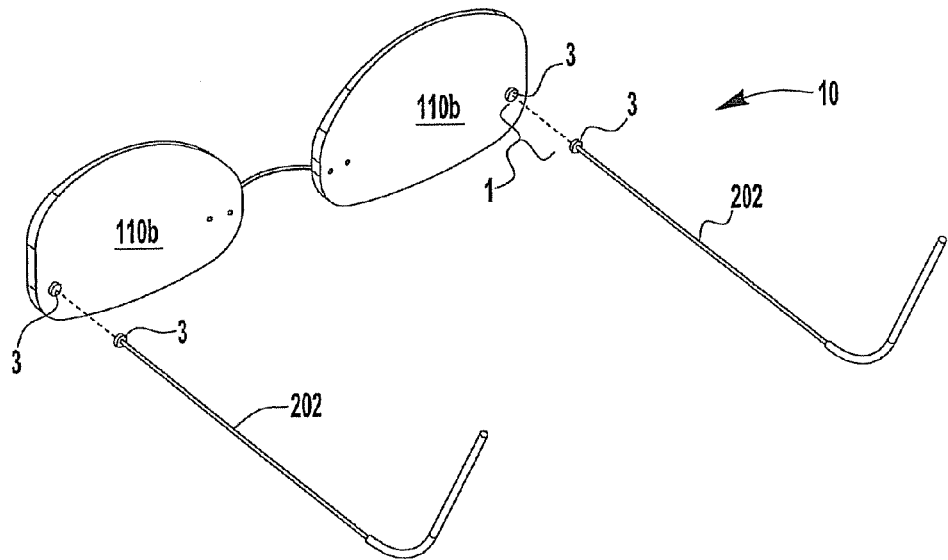

In another example shown in FIG. 37, eyewear comprises at least one set of magnets 3 comprised of at least two magnets. One member of the pair is positioned within a peripheral hole or cavity in lens, as defined and described in U.S. patent application Ser. No. 11/458,239, filed Jul. 18, 2006. Other member of the magnet pair is positioned in or on first end of temple bar 202a, the magnets 3 of the pair being of substantially opposite polarities and being generally alignable to removably attach temple bar 202 and lenses. In the examples shown in FIGS. 1, 2, 5, and 6, second ends of frame fronts 502b are magnetically connected to temple bars 202 as described above.

Eyewear 10 optionally comprises a flexible hinge bar 30 and a means for limiting rotation as shown in FIG. 24. In the open position, as defined above and shown as the solid lines in FIG. 24A, temple bar 202 is substantially aligned with frame front 502, with angle α being about 90°. When pressure or force is exerted on member, member rotates about axis so that angle α is greater than about 150°, as shown by the dashed lines in FIG. 24. In the example shown, means for limiting rotation comprises a contacting surface on ends of members 2 such that when contacting surfaces come into contact, members 2 will disengage if pressure is not substantially removed. Flexible hinge bar 30 provides flexibility to member 2 such that when pressure is released or removed, magnets 3 substantially realign, thereby causing members 2 to realign so that members 2 are in the substantial open position. When contacting surfaces come into contact and are forced against each other, members 2 disengage.

Magnetic Connector Between Frame Front And Swivel Temple Bars

In another example shown in FIG. 36, magnets 3 are positioned substantially parallel to each other in a vertical plane and have opposing surfaces 3d that are substantially complementary, the angle of opposing surfaces 3d being about 45°. Magnets 3 are positioned in or on members 2 as described above, and members 2 are substantially aligned when magnets 3 are in sufficient proximity to create a magnetic field of attraction between members 3. At least one magnet 3 is able to swivel about axis 7 to move member swivel temple bar 22 from opened (FIG. 36B) to closed (FIG. 36C) positions. FIG. 36D shows the swivel orientation of members 2. Swivel temple bar 222 rotates about axis 7 in a substantial conical or funnel-type pattern rather than rotating in a plane that is substantially perpendicular to the plane of the lens 110 (in which conventional temple bars such as those shown in FIGS. 1 to 6, e.g., rotate). Swivel temple bars 222 are maximally rotated at the open position, which is about 90° from the plane of the lenses 110, and at the closed position, which is substantially parallel to the plane of the lenses 110 and in substantial proximity to the lenses 110. At both maximal rotations, swivel temple bars 222 are in substantially the same plane that traditional temple bars 202 are in when open and closed, respectively.

Magnetic Connector Connecting Eye Wire And Frame Front

Figure 33A:
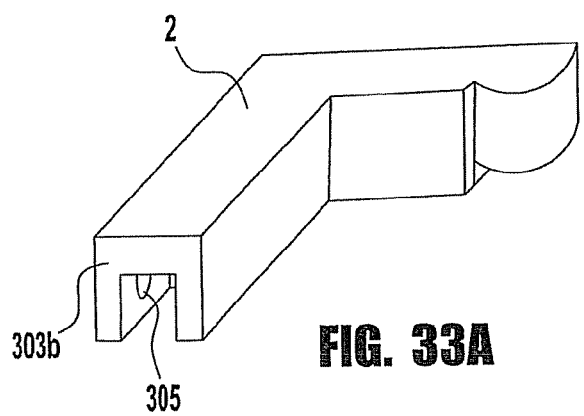
FIGS. 33A-33B show perspective views of an example of an embodiment of the magnetic connector in combination with an eyewire.
Figure 33B:
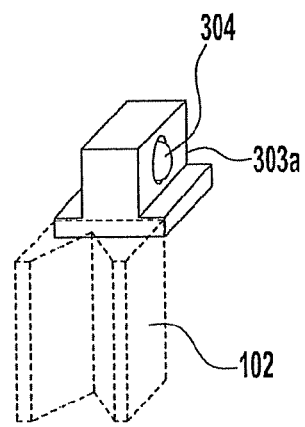

In another example, magnetic connector 1 comprises male 303a and female 303b magnet that magnetically connect member eyewire 102 and member frame front 502 as shown in FIG. 33. Eyewire 102 has a groove for engagement of an edge of a lens 110. One of the magnets 303a, 303b is positioned in or on the eyewire 102 (FIG. 33B) and the other magnet 303a, 303b is positioned in or on the frame front 502 (FIG. 33A). The means of positioning magnets 303a, 303b in or on eyewire 102 and frame front 502 is determined, at least in part, by the materials from which these members are made.

In the example shown, male magnet 303a is positioned on eyewire 102 and female magnet 303b is positioned on frame front 502, although in other examples, female magnet 303b could be positioned on eyewire 102 and male magnet 303a could be positioned on frame front 502. Magnets 303a, 303b are substantially aligned so that male magnet 303a fits into female magnet 303b. In the example in FIG. 33, magnets are positioned substantially parallel to each other in a horizontal plane, but in other examples, magnets are positioned substantially parallel to each other in a vertical plane. Male and female magnets 303a, 303b have opposite polarities so that when the magnets are positioned in sufficient proximity to each other to create a magnetic field of attraction, member eyewire 102 and member frame front 502 are magnetically connected because the magnetic attractive force therebetween pulls eyewire 102 and frame front 502 towards each other. In other examples, each magnet 303a, 303b comprising magnetic connector 1 comprises more than one magnet to increase the strength of magnetic attraction.

Optionally, male and female magnets 303a, 303b further comprise a cushion mechanism 304 that further secures the connection between magnets 303a, 303b, thereby increasing the strength of the connection between member eyewire 102 and member frame front 502. The cushion mechanism 304 may be, for examples, a rubber sphere cushion (FIG. 33D) or a spring cushion (FIG. 33C). In the examples shown, male magnet 303a has rubber sphere or spring cushions 304 that lock into or engage with corresponding sockets 305 in female magnet 303b that are substantially aligned with cushions 304 in male magnet. When male magnet 303a is inserted into female magnet 303b, cushion 304 compresses and then expands into sockets 305 when male and female magnets 303a, 303b are fully engaged.

Magnetic Connector Between Ends of Eyewire

In the examples shown in FIGS. 26 and 27, eyewear 10 comprises an eyewire having ends 102a, 102b that are magnetically connected by magnetic connector 1. FIG. 26 shows the eyewear 10 magnetically connected. FIG. 27A shows an exploded perspective view of an example of an eyewire 102 comprising three pieces that are connected by magnetic connectors 1 located both nasally and temporally. FIG. 27B shows a perspective view of a unitary eyewire 102 having magnetic connectors 1 located temporally. In the examples shown, magnets 3 are positioned substantially parallel to each other in a horizontal plane but magnets 3 could also be positioned substantially parallel to each other in a vertical plane. Further, each magnet 3 could comprise more than one magnetic to increase strength of magnetic attraction.

Eyewire 102 comprises at least one piece. In the example shown, magnets 3 are sintered and compressed around ends of eyewire 102a, 102b. As shown, lenses 110 are secured in eyewire when ends of eyewire 102a, 102b are magnetically connected by magnetic connectors 1. Magnetic connection of ends of eyewire 102a, 102b permits easy removal and replacement of lenses 110, such as to change the aesthetic appearance of eyewear or to replace damaged lenses or to interchange untinted lenses and tinted lenses, such as to accommodate use of eyewear indoors and outdoors, or in the light and dark. In another example (not shown) additional lenses could be inserted over each of first lenses to add tinted lenses.

Magnetic Connector Connecting Nose Pad To Eye Wire With Or Without Nose Pad Arm

Figure 28:
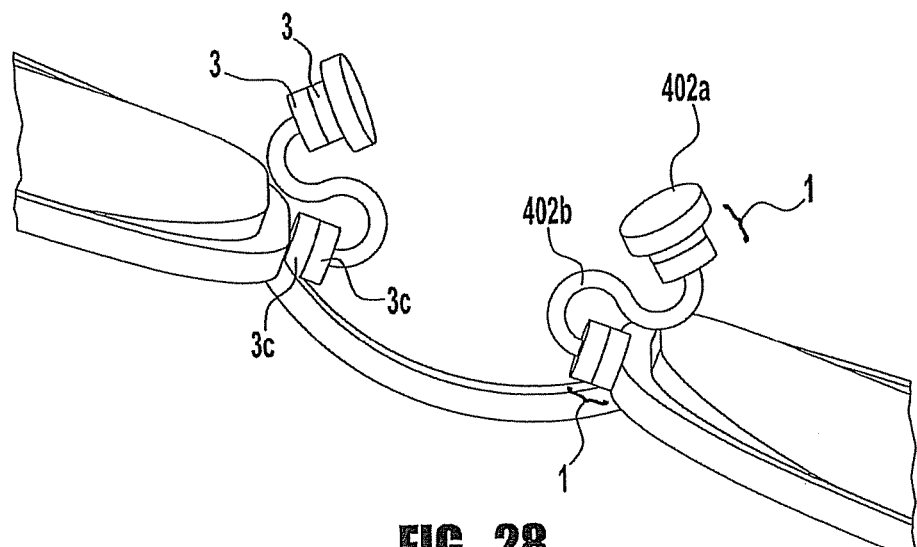
FIG. 28 shows a perspective view of an example of an embodiment of the magnetic connector in combination with nose pads and nose pad arms.
Figure 29:
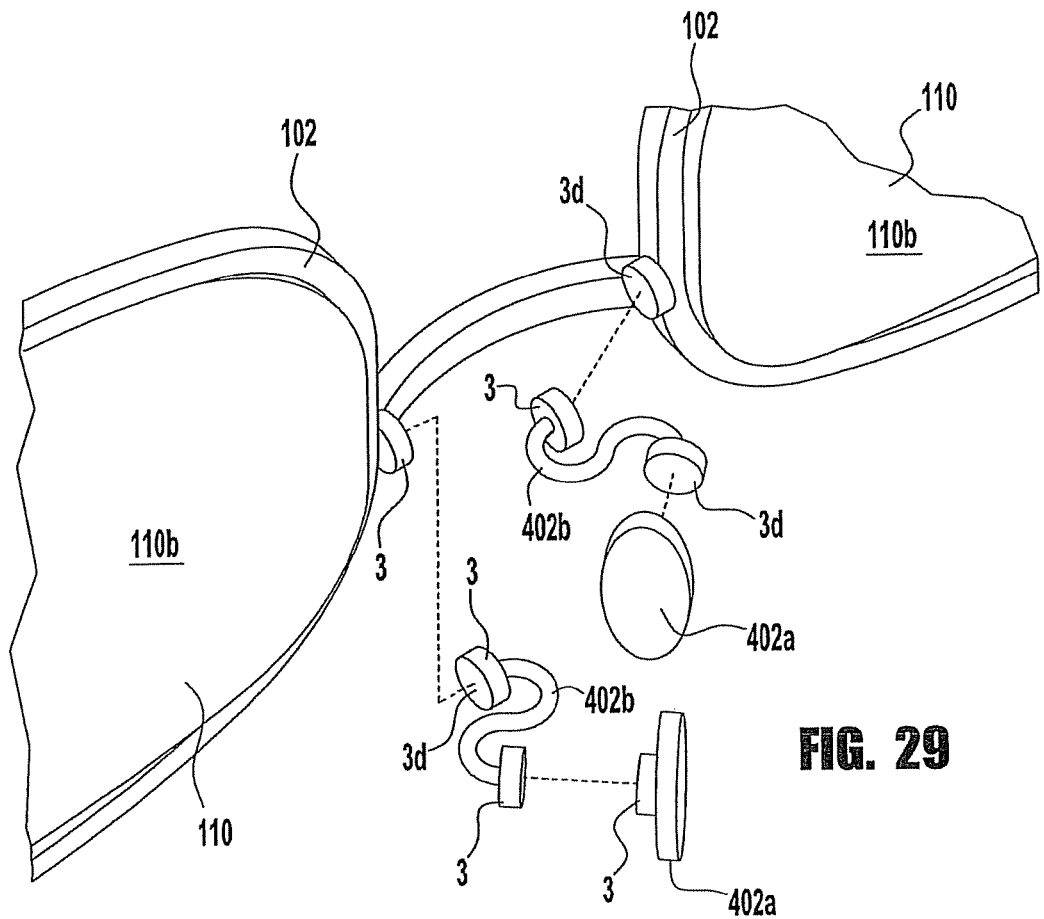
FIG. 29 shows an exploded perspective view of an example of an embodiment of the magnetic connector in combination with nose pads and nose pad arms.

In another example shown in FIGS. 28 and 29, one magnetic connector 20 connects nose pad 402a and nose pad arm 402b and a second magnetic connector connects nose pad arm 402b to eyewire 102 thereby enabling the nose pad 402a and/or nose pad arm 402b to be removably attached for easy replacement. In another example (not shown) nose pad arm 402b is connected to eyewire 102 by conventional means and to nose pad 402a by a magnetic connector 1. FIG. 28 shows the nose pads 402a and nose pad anus 402b magnetically connected and FIG. 29 shows an exploded view showing the component parts.

Each nose pad 402a is preferably made of a pliable, hypoallergenic material, such as for examples plastic, rubber, vinyl, silicone, titanium, stainless steel, polycarbonate, or a combination thereof. Nose pad 402a is any thickness that does not interfere with its function, but must not be so thick that it interferes with the magnetic strength of the magnetic connector. Magnets 3 have opposite polarities and are substantially aligned so that nose pad 402a is substantially centered over nose pad arm 402b to position the eyeglasses 10 on the wearer's nose. In an example, nose pad 402a has a pocket into which magnet 3 is inserted. In another example, magnet 3 is adhered by any means known in the art to an outer surface of nose pad 402a, or nose pad 402a may be formed around magnet 3. As described above, the means of adhering or attaching magnets 3 to the nose pad 402a or nose pad arm 402b may be determined, at least in part, by the materials from which the nose pad and nose pad arm are made, and with concern to maintain magnetic properties of magnets.

In the examples shown in FIGS. 28-29, nose pad arm 402b has two ends, one end for attachment to eyewire 102 and one end for attachment to nose pad 402a. In the examples shown, nose pad arm 402b is a J-shaped wire. In a preferred example, nose pad arm 402b is adjustable so that the angle of the nose pad arm 402b can be adjusted so that nose pad 402a fits substantially flush against a surface of the wearer's nose. In the example shown, one end of nose pad arm is magnetically attached to eyewire 102 by a magnetic connector 1, but in other examples (not shown) nose pad arm 402b is permanently attached or connected to eyewire 102 such as by welding, soldering, gluing, or the like. The other end of nose pad arm has a magnet 3 that is magnetically attracted to a magnet in or on nose pad 402a, described below. Nose pad arms 402b are substantially opposed and rest the mass of the eyewear on the sides of the wearer's nose.

In another example (not shown) J-shaped wire of nose pad arm 402b has a socket on first end to which a protrusion on the nose pad 402a is inserted. Protrusion may be either a notch or a notch having a magnet 3 therein that is magnetically attracted to a magnet 3 having a substantial opposite polarity and positioned in or on nose pad arm 402b for magnetic connection of nose pad 402a of nose pad arm 402b.

Magnetic Nose Pad Assembly

Figure 38:
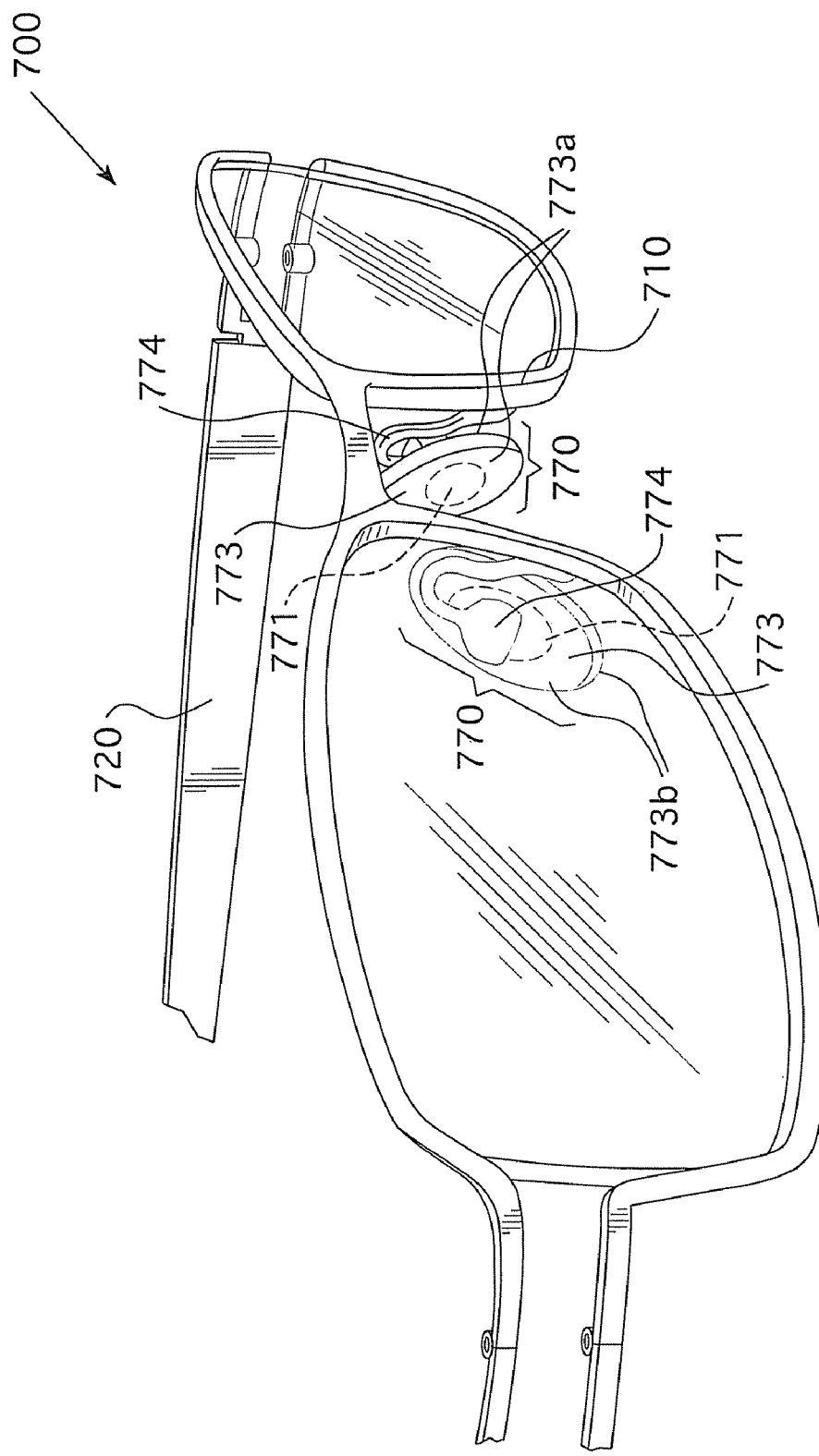
FIG. 38 shows a front perspective view of a pair of eyeglasses having a pair of an embodiment of the magnetic nose pad assembly.
Figure 39:
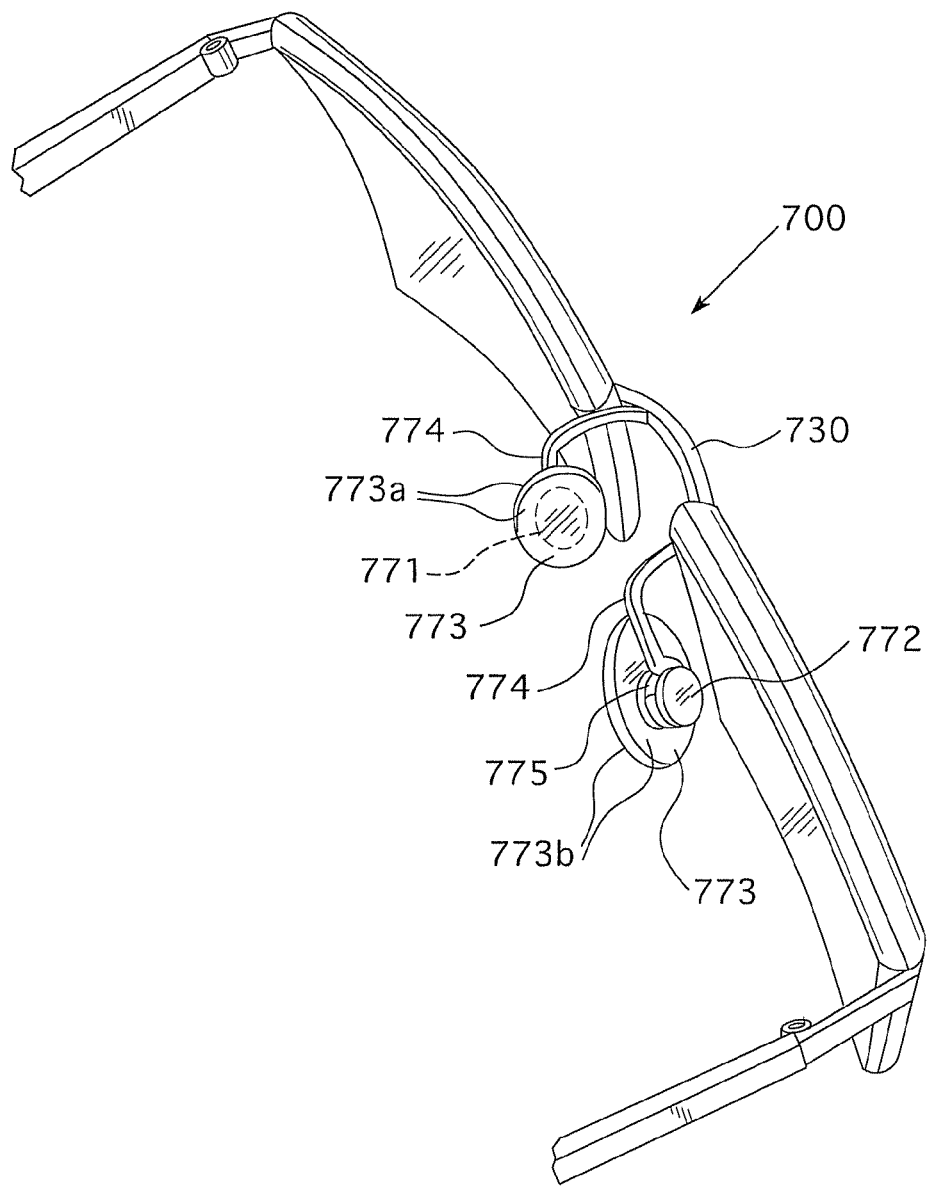
FIG. 39 shows a rear perspective view of a pair of eyeglasses having a pair of an embodiment of the magnetic nose pad assembly.
Figure 40:
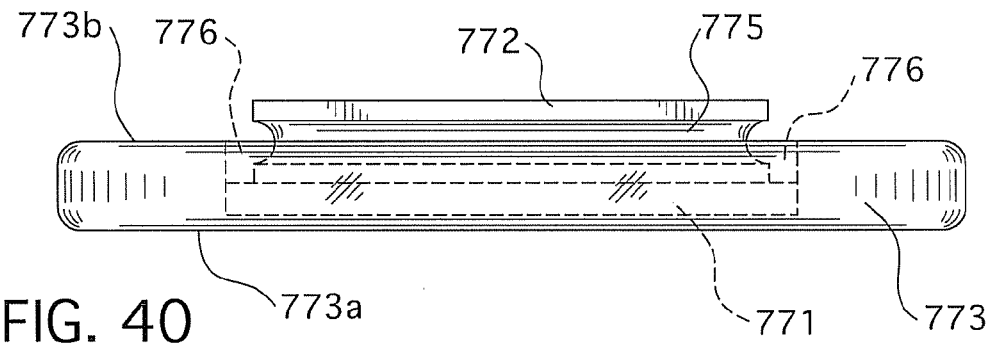
FIG. 40 shows a side view of an embodiment of the magnetic nose pad assembly without the nose pad arm.

An example of a pair of eyeglasses 700 including a pair of magnetic nose pad assemblies 770 is shown in FIGS. 38 and 39. The eyeglasses have at least two members 710, 720 connected to each other. As shown generally in FIGS. 40-51, each magnetic nose pad assembly 770 has two magnetic parts 771, 772, where each magnetic part is capable of being attracted to or acquiring the properties of a magnet. In an embodiment, magnetic parts 771, 772 are each a magnet, where one magnet 771 has a polarity that is opposite that of the other magnet 772. In another embodiment, one of the magnetic parts 771, 772 is a magnet and the other magnetic part 772, 771 is a piece of material such as a ferromagnetic material that is attractable to magnet 771, 772. For simplicity, magnetic parts 771, 772 are referred to throughout as magnets, but this term is understood to include parts capable of being attracted by or acquiring the properties of a magnet, as described above.

As shown in FIGS. 43-50, the magnetic nose pad assembly 770 also has a nose pad 773 and a nose pad arm 774. Nose pad 773 and nose pad arm 774 are magnetically connected to each other during use by first and second magnets 771, 772 to facilitate easy removal of the nose pad 773 from the eyeglasses 700 for replacement required by damage, wear, and the like.

The nose pad 773 is made of a pliable, hypo-allergenic material, such as for examples plastic, rubber, vinyl, silicone, titanium, stainless steel, polycarbonate, or a combination thereof. The nose pad 773 has two surfaces 773a, 773b. A first surface 773a is configured to engage a user's nose during use and second surface 773b has a cavity 776 therein, as shown for example in FIGS. 47 and 48. In use, second surface 773b is opposed to a surface 772a of second magnet 772.

Figure 41:
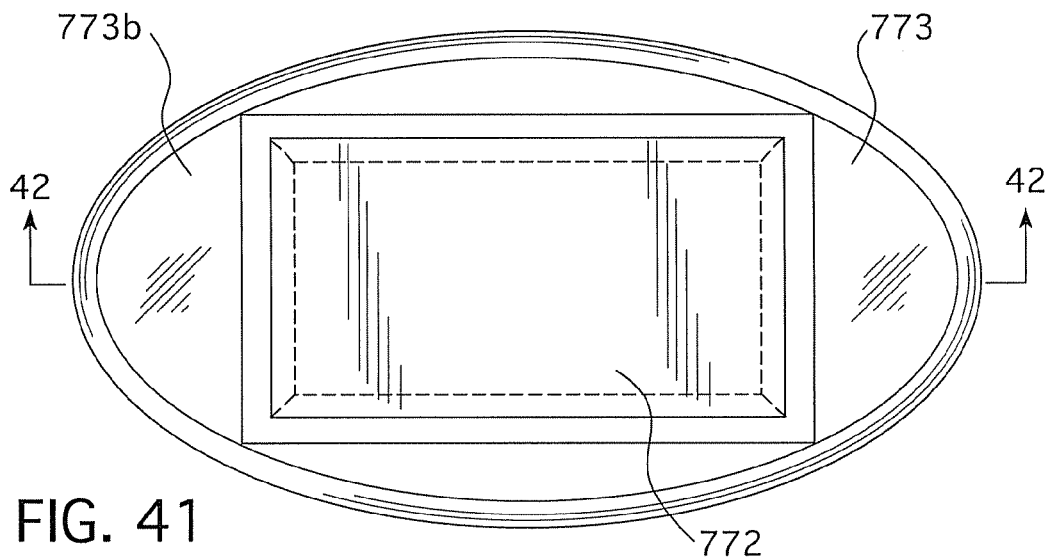
FIG. 41 shows a top view of the magnetic nose pad assembly shown in FIG. 40.
Figure 42:
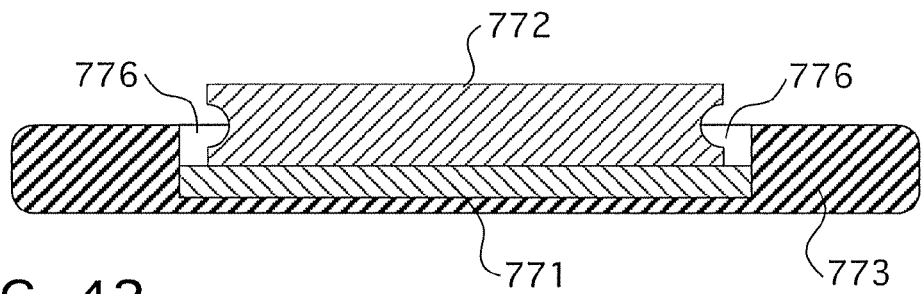
FIG. 42 shows a cross-sectional view of the magnetic nose pad assembly along line 42-42 in FIG. 41.
Figure 43:
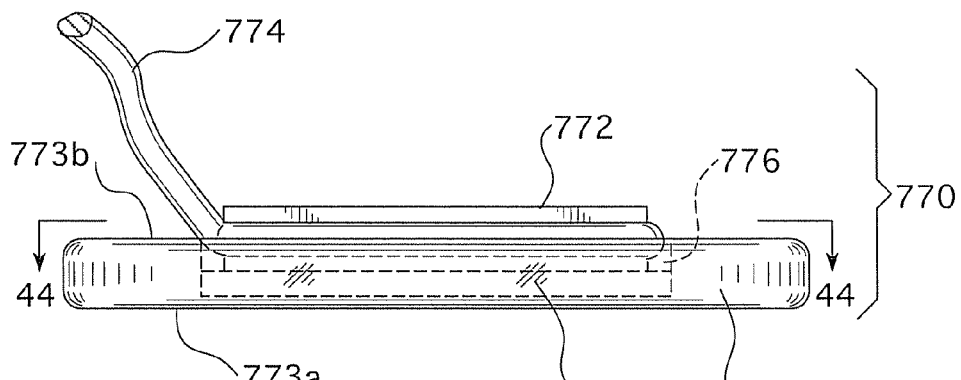
FIG. 43 shows a side view of the magnetic nose pad assembly shown in FIG. 40 with the nose pad arm attached.
Figure 44:
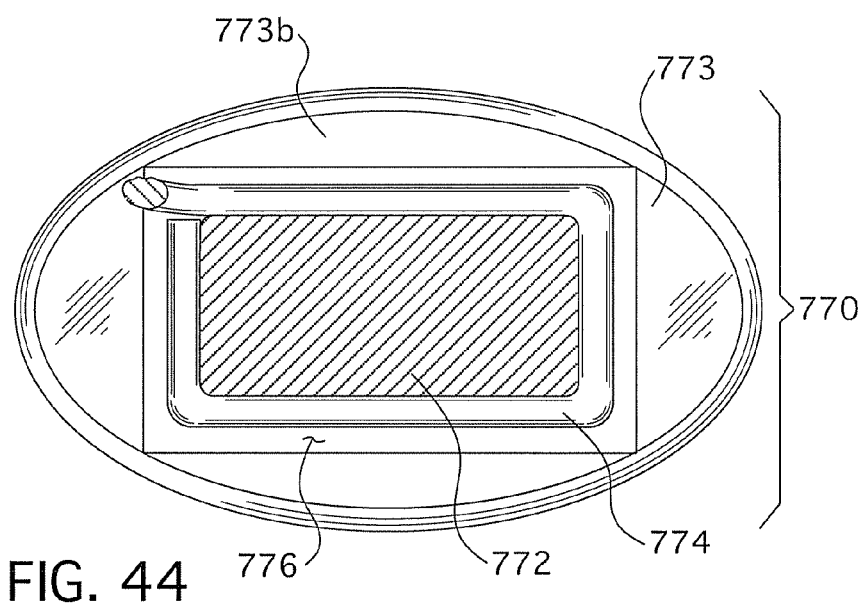
FIG. 44 shows a cross-sectional view of the magnetic nose pad assembly along line 44-44 in FIG. 43.
Figure 45:
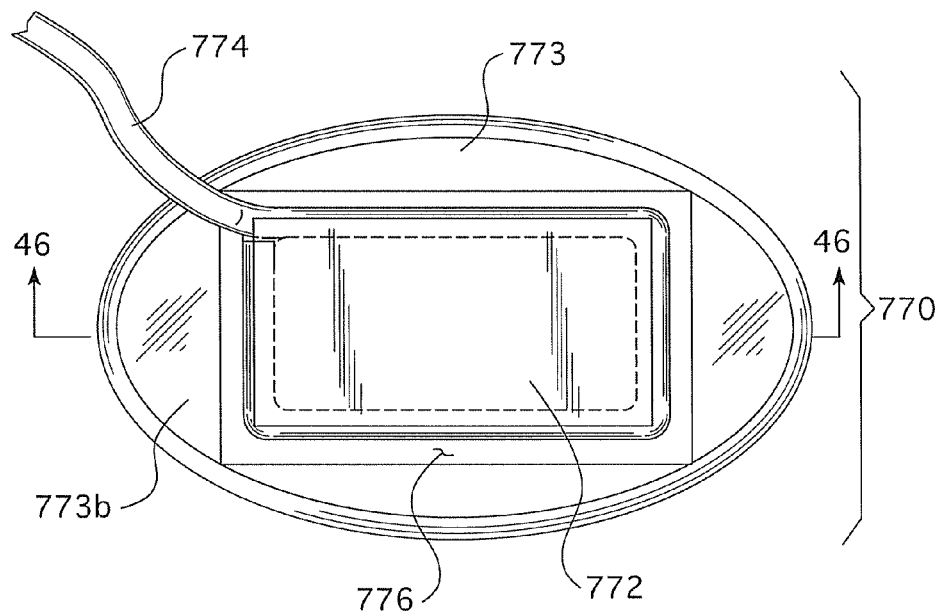
FIG. 45 shows a top view of an embodiment of the magnetic nose pad assembly shown in FIG. 43.
Figure 46:
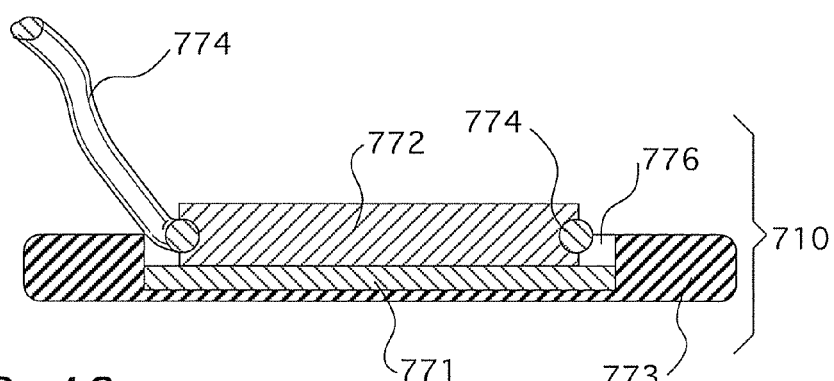
FIG. 46 shows a cross-sectional view of the magnetic nose pad assembly along line 46-46 in FIG. 45.

As shown in FIGS. 41, 45, and 51, first magnet 771 is substantially embedded in the cavity 776 and has a surface 771a that engages an opposing surface 772a on second magnet 772 during use. Optionally, second magnet 772 is at least partially embedded in cavity 776. In another embodiment, second magnet 772 is not embedded in cavity 776 but rather surface 772a of second magnet 772 sits substantially flush with second surface 773b of nose pad. Optionally, as shown generally in FIGS. 39-42, 44, 45, and 47, second magnet 772 has a groove 775 that is machined or drilled around a perimeter thereof. Optionally, second magnet 772 is positioned such that groove 775 is at least partially embedded in cavity 776 so as to minimize lateral slippage of the nose pad 773 relative to second magnet 772 thereby also minimizing unintentional magnet 771, 772 separation.

Figure 47:
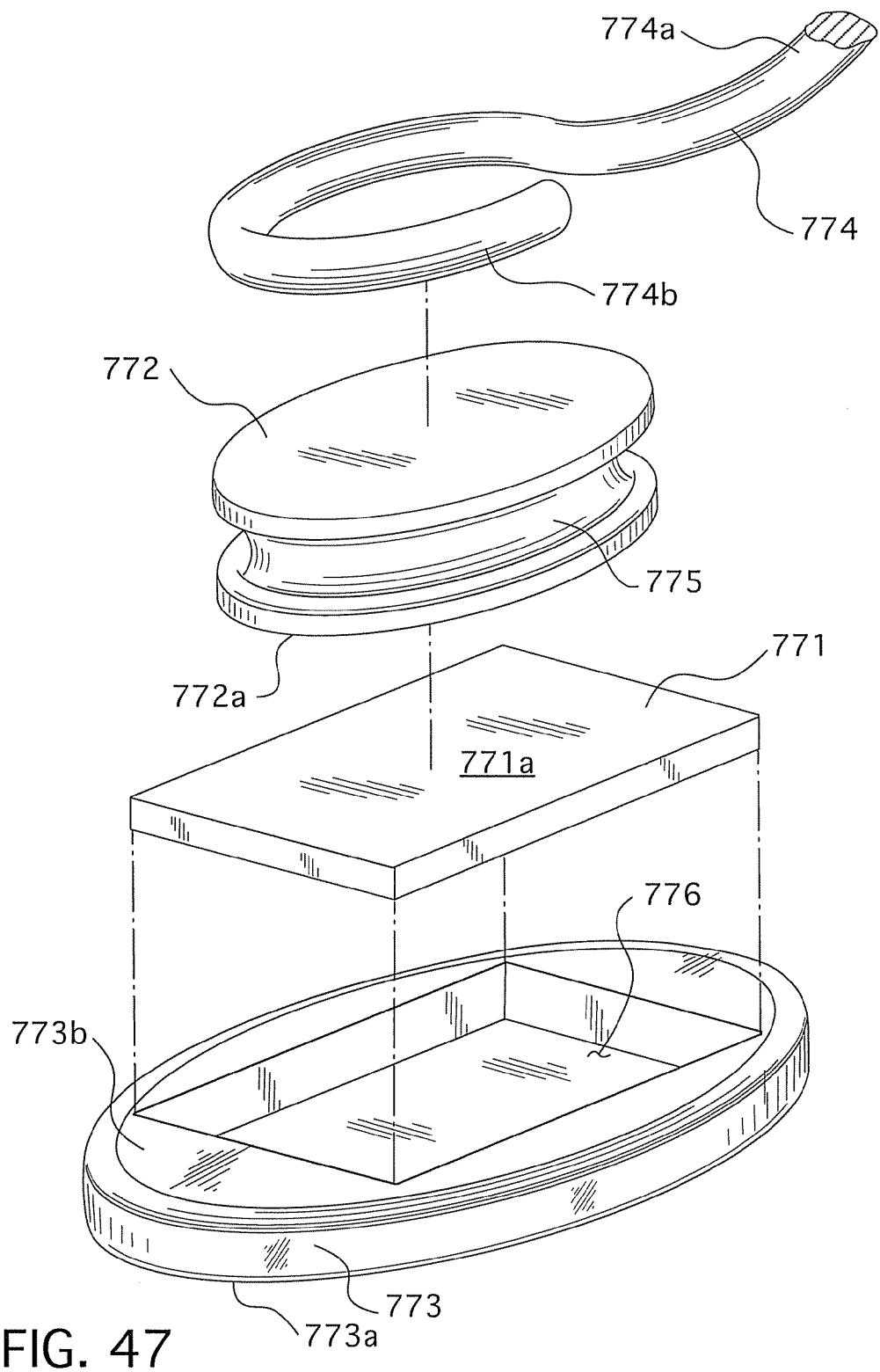
FIG. 47 shows an exploded view of the magnetic nose pad assembly shown in FIG. 43.
Figure 48:
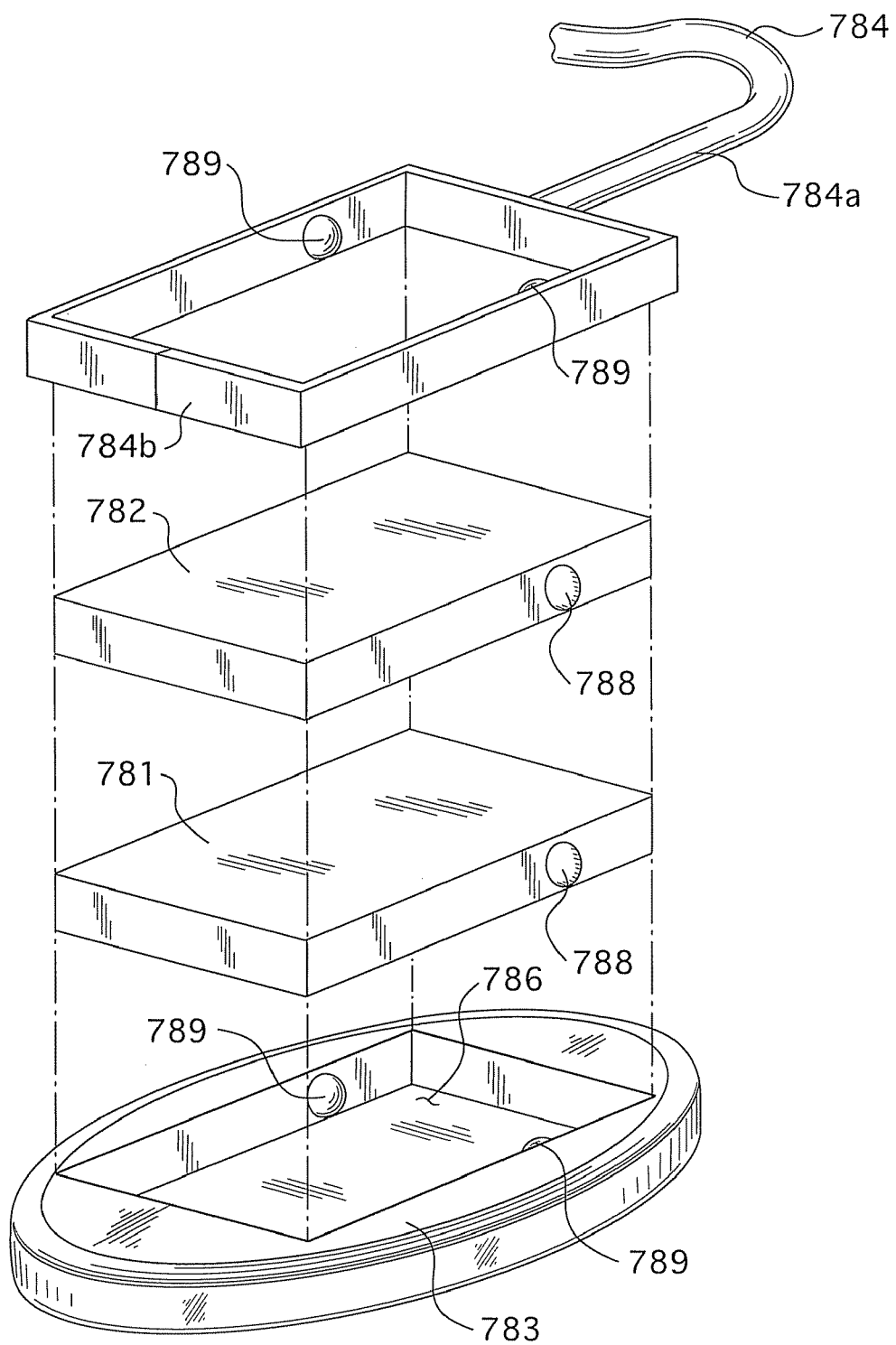
FIG. 48 shows an exploded view of another embodiment of the magnetic nose pad assembly.

As shown in FIGS. 38, 39 and 47, the nose pad arm 774 has first and second ends 774a, 774b. First end 774a is configured to attach to a member 710, 720, 730 of a pair of eyeglasses 700. In examples, member is an eyewire 710 (FIG. 38) or a bridge piece 730 (FIG. 39). In an example, first end of nose pad arm 774a is magnetically attached to the member 710, 720, 730 of the eyeglasses 700 by a magnetic connector 1 such as the one described above. In another example, the nose pad arm 774 is integral with one of member 710, such as when member 710 is stamped out of a flat sheet of metal and then curved. In another example, first end of nose pad arm 774a is permanently attached to the member 710, 720, 730 of the eyeglasses such as by welding, soldering, gluing, bolting, or the like.

Second end of nose pad arm 774b is attached to second magnet 772. In an embodiment, at least a portion of the second end of nose pad arm 774b is positioned in the groove 775 extending around the perimeter of second magnet 772 to secure nose pad arm 774 to second magnet 772 as shown in FIGS. 39 and 44-46. In an alternate embodiment, at least a portion of the second end of nose pad arm 774b is flattened and wrapped around a perimeter surface of second magnet 772. See, e.g., FIGS. 30-31.

In another embodiment shown in FIGS. 48-51, second end of nose pad arm 784a is substantially flat and wraps around at least a portion of the perimeter of the second magnet 782 to secure nose pad arm 784 to second magnet 782. Second end of nose pad arm 784a has at least two dimples 789, 789 that protrude from an interior surface and engage with divots 788, 788 positioned on at least two sides of second magnet 782. Nose pad 783 has a cavity 786 with dimples 789, 789 that protrude from an interior surface and engage with divots 788, 788 positioned on at least two sides of first magnet 781. In an alternate embodiment (not shown), second end of nose pad arm has at least two divots positioned in an interior surface that engage with at least two dimples that protrude from at least two sides of second magnet. In another alternate embodiment (not shown), nose pad has a cavity with divots positioned in an interior surface that engage with at least two dimples that protrude from at least two sides of first magnet. Dimples and divots secure first and second magnets in cavity and to nose pad arm, respectively.

Magnetic Connectors On Banded Eyewear

Figure 35A:
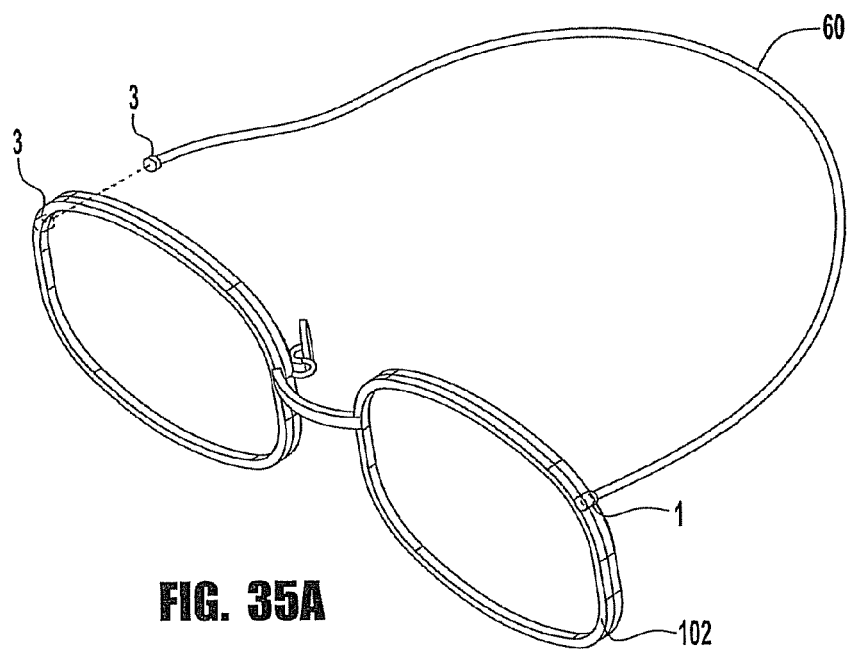
FIG. 35 shows perspective views of an examples of embodiments of the magnetic connector in combination with banded eyewear.
Figure 35B:
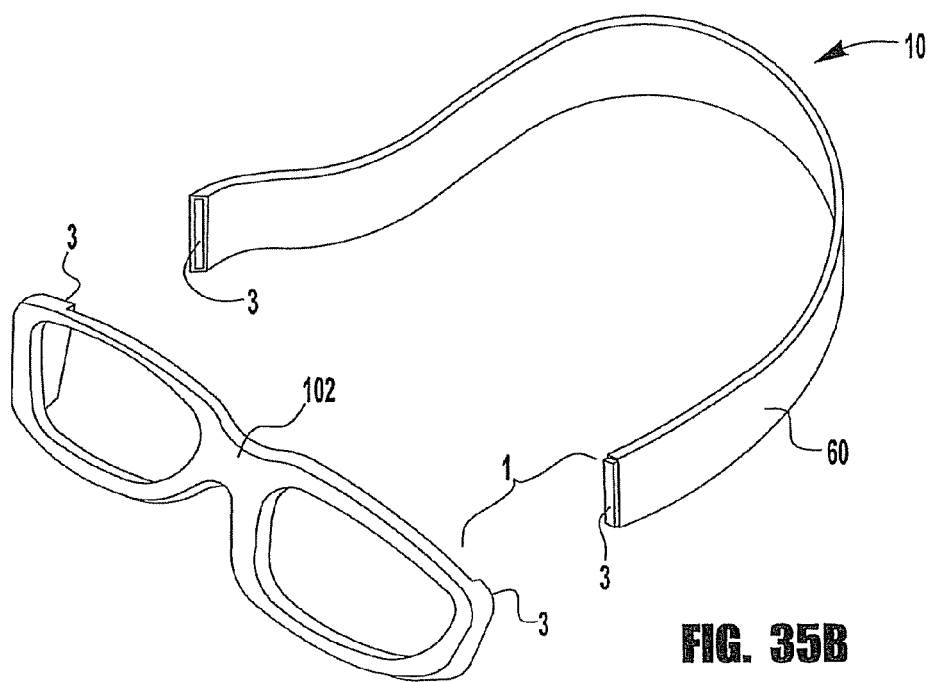
Figure 36A:
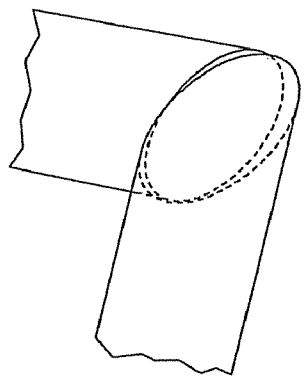
FIG. 36 shows a top view of an example of an embodiment of the magnetic connector in combination with eyewear having swivel temple bars.
Figure 36B:
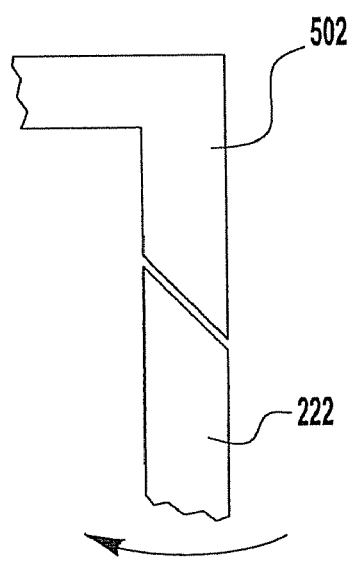
Figure 36C:
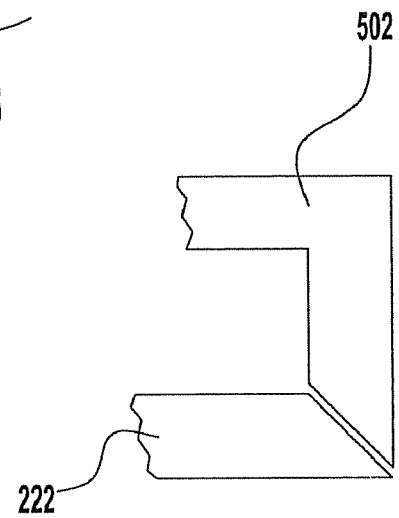
Figure 36D:
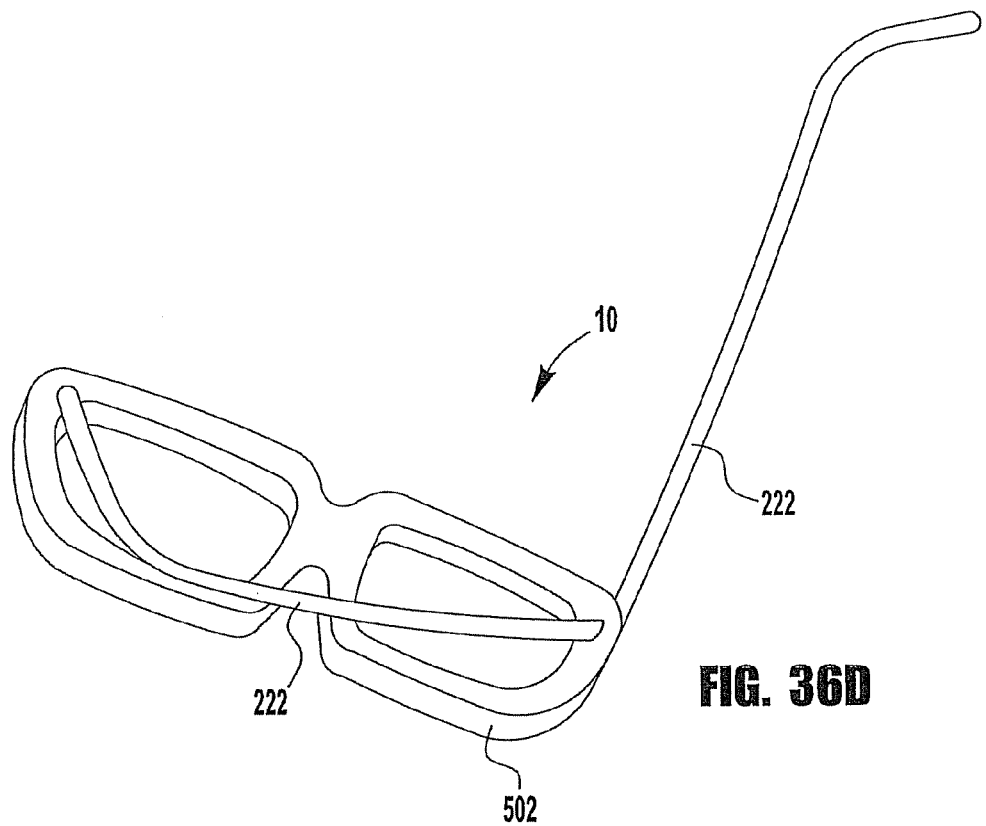
Figure 36E:
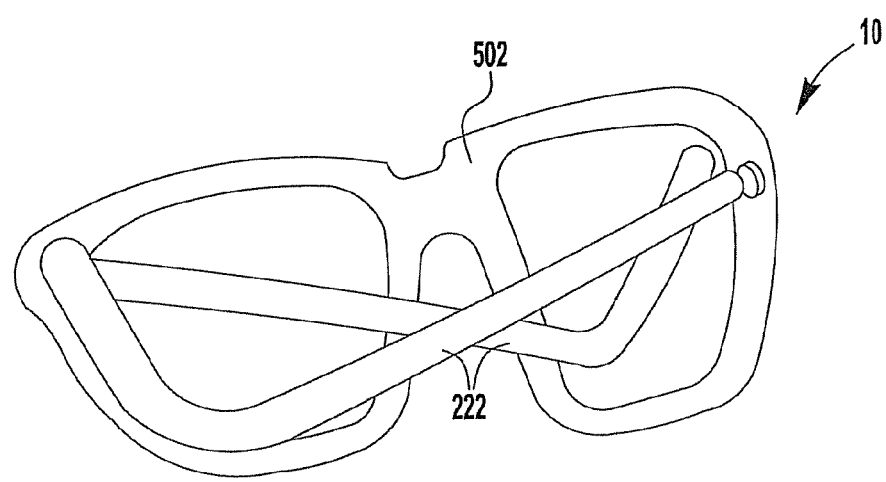

In another example such as the one shown in FIG. 35, magnetic connector 1 is used in combination with banded eyewear such as goggles, for example, to magnetically connect band 60 to eyewire 102 or frame front 502. Band 60 may be either a linear wire band or a flat strap band. One magnet 3 of magnetic connector 1 is either positioned in or on frame front 102 and other magnet 3 is either positioned in or on ends of band 60. In another example where banded eyewear 10 is drilled rimless, magnet 3 is located in an end of frame front or is embedded within lens. In another example, magnet 3 is sewn within fabric band 60 or is bonded to band 60 with glue or epoxy. In an example, magnet 3 is sintered and compressed around ends of band member 60.

While the foregoing has been set forth in considerable detail, it is to be understood that the drawings and detailed embodiments are presented for elucidation and not limitation. Design variations, especially in matters of shape, size and arrangements of parts may be made but are within the principles of the invention. Those skilled in the art will realize that such changes or modifications of the invention or combinations of elements, variations, equivalents or improvements therein are still within the scope of the invention as defined in the appended claims.

I claim:

1. A magnetic nose pad assembly for use with a pair of eyeglasses, comprising:
   a. a nose pad having a first surface and a second surface that is oppositely disposed on said nose pad from said first surface, said second surface of said nose pad including an area that defines a cavity in said nose pad wherein a portion of said second surface that defines said cavity is a bottom surface that is oppositely disposed from the first surface of said nose pad, said nose pad including a first magnetic part that is embedded in said cavity, said first magnetic part having a first surface that faces the bottom surface of said cavity said first magnetic part also having a second surface that is oppositely disposed on said first magnetic part from the first surface of said first magnetic part; and
   b. a nose pad arm having a first end that is configured to attach to a member of said eyeglasses and a second end that is attached to a second magnetic part, said second magnetic part having a first surface that is configured to contact the second surface of said first magnetic part during use to magnetically connect said nose pad and said nose pad arm for facile attachment and removal of the nose pad and the nose pad arm.

2. The magnetic nose pad assembly as in claim 1, wherein said member is selected from the group consisting of a bridge piece and an eyewire.

3. The magnetic nose pad assembly as in claim 1, wherein at least one of said first and second magnetic parts is a magnet.

4. The magnetic nose pad assembly as in claim 1, wherein said second magnetic part has a perimeter groove.

5. The magnetic nose pad assembly as in claim 4, wherein at least a portion of said second end of said nose pad arm is positioned in said groove.

6. The magnetic nose pad assembly as in claim 1, wherein at least a portion of said second end of said nose pad arm is substantially flat.

7. The magnetic nose pad assembly as in claim 1, wherein said first magnetic part has a divot positioned on a side that is configured to receive a dimple protruding from a side of said cavity and wherein said second magnetic part has a divot positioned on a side that is configured to receive a dimple protruding from said second end of said nose pad arm.

8. A magnetic nose pad assembly for use with a pair of eyeglasses, comprising:
   a. a nose pad having a first surface and a second surface that is oppositely disposed on said nose pad from said first surface, said second surface of said nose pad including an area that defines a cavity in said nose pad wherein a portion of said second surface that defines said cavity is a bottom surface that is oppositely disposed from the first surface of said nose pad;

b. a first magnetic part that is embedded in said cavity of said nose pad, said first magnetic part having a first surface that faces the bottom surface of said cavity, said first magnetic part also having a second surface that is oppositely disposed on said first magnetic part from the first surface of said first magnetic part;

c. a second magnetic part configured for magnetic attraction with said first magnetic part, said second magnetic part having a first surface that contacts the second surface of said first magnetic part during use; and d. a nose pad arm having a first end that is configured to attach to a member of said eyeglasses and a second end that is attached to said second magnetic part, wherein said first and second magnetic parts are configured to come into contact with each other during use to magnetically connect said nose pad and said nose pad arm through said first and second magnetic parts at times when the second surface of said first magnetic part is in contact with the first surface of said second magnetic part for facile attachment and removal of the nose pad and the nose pad arm.

9. The magnetic nose pad assembly as in claim 8, wherein at least one of said first and second magnetic parts is a magnet.

10. The magnetic nose pad assembly as in claim 8, wherein said member is selected from the group consisting of a bridge piece and an eyewire.

11. The magnetic nose pad assembly as in claim 8, wherein said second magnetic part has a perimeter groove.

12. The magnetic nose pad assembly as in claim 11, wherein at least a portion of said second end of said nose pad arm is positioned in said groove.

13. The magnetic nose pad assembly as in claim 8, wherein at least a portion of said second end of said nose pad arm is substantially flat.

14. The magnetic nose pad assembly as in claim 8, wherein said second magnetic part is configured to be at least partially embedded in said cavity during use.

15. The magnetic nose pad assembly as in claim 8, wherein said first magnetic part has a divot positioned on a side that is configured to receive a dimple protruding from a side of said cavity and wherein said second magnetic part has a divot positioned on a side that is configured to receive a dimple protruding from said second end of said nose pad arm.

16. A pair of eyeglasses, comprising:
a. connected first and second members; and
b. a magnetic nose pad assembly set, each member of the set including:
 (i) a nose pad having a first surface and a second surface that is oppositely disposed on said nose pad from said first surface, said second surface of said nose pad including an area that defines a cavity in said nose pad wherein a portion of said second surface that defines said cavity is a bottom surface that is oppositely disposed from the first surface of said nose pad;
 (ii) a first magnetic part that is embedded in said cavity of said nose pad, said first magnetic part having a first surface that faces the bottom surface of said cavity, said first magnetic part also have a second surface that is oppositely disposed on said first magnetic part from the first surface of said first magnetic part;
 (iii) a second magnetic part configured for magnetic attraction with said first magnetic part, said second magnetic part having a first surface that contacts the second surface of said first magnetic part during use; and
 (iv) a nose pad arm having a first end that is configured to attach to said first member and a second end that is attached to said second magnetic part,
wherein said first and second magnetic parts are configured to come into contact with each other during use to magnetically connect said nose pad and said nose pad arm through said first and second magnetic parts at times when the second surface of said first magnetic part is in contact with the first surface of said second magnetic part for facile attachment and removal of the nose pad and the nose pad arm.

17. The magnetic nose pad assembly as in claim 16, wherein at least one of said first and second magnetic parts is a magnet.

18. The pair of eyeglasses as in claim 16, wherein at least one of said members is selected from the group consisting of an eyewire and a bridge piece.

19. The pair of eyeglasses as in claim 16, wherein said second magnetic part has a perimeter groove configured to house at least a portion of said second end of said nose pad arm.

20. The pair of eyeglasses is in claim 16, wherein said second magnetic part is configured to be at least partially embedded in said cavity.

\* \* \* \* \*